(12) United States Patent
Schlueter et al.

(10) Patent No.: US 7,542,488 B2
(45) Date of Patent: Jun. 2, 2009

(54) FIBER LASER

(75) Inventors: Holger Schlueter, Princeton, NJ (US); Rolf Biekert, Farmington, CT (US)

(73) Assignee: Trumpf, Inc., Farmington, CT (US)

( * ) Notice: Subject to any disclaimer, the term of this patent is extended or adjusted under 35 U.S.C. 154(b) by 601 days.

(21) Appl. No.: 10/763,390

(22) Filed: Jan. 26, 2004

(65) Prior Publication Data

US 2004/0218635 A1 Nov. 4, 2004

Related U.S. Application Data

(60) Provisional application No. 60/470,446, filed on May 15, 2003, provisional application No. 60/442,123, filed on Jan. 24, 2003.

(51) Int. Cl.
*H01S 3/30* (2006.01)
(52) U.S. Cl. .......................................... 372/6; 385/127
(58) Field of Classification Search ................... 372/6; 385/127
See application file for complete search history.

(56) References Cited

U.S. PATENT DOCUMENTS

| | | | |
|---|---|---|---|
| 4,815,079 A | 3/1989 | Snitzer et al. | |
| 4,829,529 A | 5/1989 | Kafka | |
| 5,027,079 A * | 6/1991 | Desurvire et al. | 359/341.32 |
| 5,212,707 A | 5/1993 | Heidel et al. | |
| 5,418,880 A | 5/1995 | Lewis et al. | |
| 5,566,196 A | 10/1996 | Scifres | |
| 5,627,848 A | 5/1997 | Fermann et al. | |
| 5,694,408 A | 12/1997 | Bott et al. | |
| 5,710,786 A | 1/1998 | Mackechnie et al. | |
| 5,774,484 A * | 6/1998 | Wyatt et al. | 372/6 |
| 5,790,720 A | 8/1998 | Marcuse et al. | |
| 5,805,621 A | 9/1998 | Grubb et al. | |
| 5,818,630 A | 10/1998 | Fermann et al. | |
| 5,867,305 A | 2/1999 | Waarts et al. | |
| 5,880,877 A | 3/1999 | Fermann et al. | |
| 5,905,745 A | 5/1999 | Grubb et al. | |
| 5,933,271 A | 8/1999 | Waarts et al. | |
| 5,999,673 A | 12/1999 | Valentin et al. | |
| 6,031,849 A | 2/2000 | Ball et al. | |
| 6,049,415 A | 4/2000 | Grubb et al. | |
| 6,101,199 A | 8/2000 | Wang et al. | |
| 6,151,338 A | 11/2000 | Grubb et al. | |
| 6,160,568 A | 12/2000 | Brodsky et al. | |
| 6,181,466 B1 | 1/2001 | Franzoso et al. | |
| 6,240,108 B1 * | 5/2001 | Ionov | 372/6 |
| 6,275,250 B1 | 8/2001 | Sanders et al. | |

(Continued)

FOREIGN PATENT DOCUMENTS

DE 195 35 526 4/1997

(Continued)

*Primary Examiner*—Minsun Harvey
*Assistant Examiner*—Tod T Van Roy
(74) *Attorney, Agent, or Firm*—Fish & Richardson P.C.

(57) ABSTRACT

An optical fiber for producing laser radiation at a characteristic wavelength includes a first multimode core region and an active region embedded within the core region for producing radiation at the characteristic wavelength when pumped by pump radiation. The core region is adapted for guiding the laser radiation in a longitudinal direction of the fiber and is adapted for guiding pump radiation. The active region has a sufficiently small transverse dimension such that radiation produced in the active region is not confined to the active region.

29 Claims, 21 Drawing Sheets

U.S. PATENT DOCUMENTS

| | | | |
|---|---|---|---|
| 6,275,512 | B1 | 8/2001 | Fermann |
| 6,288,835 | B1* | 9/2001 | Nilsson et al. ........... 359/341.3 |
| 6,301,421 | B1 | 10/2001 | Wickham et al. |
| 6,324,326 | B1 | 11/2001 | Dejneka et al. |
| 6,330,382 | B1 | 12/2001 | Harshbarger et al. |
| 6,347,007 | B1 | 2/2002 | Grubb et al. |
| 6,445,838 | B1* | 9/2002 | Caracci et al. ................. 385/14 |
| 6,483,974 | B1* | 11/2002 | Waarts ....................... 385/123 |
| 6,954,575 | B2* | 10/2005 | Fermann et al. ............. 385/128 |
| 6,970,631 | B2* | 11/2005 | Arbore ....................... 385/123 |
| 2002/0018287 | A1* | 2/2002 | Zellmer et al. ........... 359/341.1 |
| 2002/0018630 | A1* | 2/2002 | Richardson et al. ......... 385/127 |
| 2002/0030881 | A1 | 3/2002 | Nilsson et al. |
| 2002/0054740 | A1 | 5/2002 | Vakili et al. |
| 2002/0154388 | A1 | 10/2002 | Boubal et al. |

FOREIGN PATENT DOCUMENTS

| | | |
|---|---|---|
| DE | 196 20 159 | 11/1997 |
| DE | 199 05 491 | 8/1999 |
| DE | 198 29 684 | 1/2000 |
| DE | 199 25 686 | 12/2000 |
| DE | 199 64 083 | 7/2001 |
| DE | 100 06 050 | 8/2001 |
| DE | 100 09 379 | 9/2001 |
| DE | 100 09 380 | 9/2001 |
| DE | 100 09 381 | 9/2001 |
| DE | 100 59 314 | 6/2002 |
| DE | 102 11 352 | 9/2002 |
| EP | 0 802 592 | 10/1997 |
| EP | 0 840 411 | 5/1998 |
| EP | 0 980 122 | 2/2000 |
| EP | 1 191 372 | 3/2002 |
| EP | 1 213 802 | 6/2002 |
| GB | 2309820 | 8/1997 |
| GB | 2335074 | 9/1999 |
| GB | 2366447 | 3/2002 |
| WO | WO 95/10868 | 4/1995 |
| WO | WO 95/10869 | 4/1995 |
| WO | WO 96/20519 | 7/1996 |
| WO | WO 97/39503 | 10/1997 |
| WO | WO 99/45419 | 9/1999 |
| WO | WO 01/24326 | 4/2001 |
| WO | WO 02/11255 | 2/2002 |
| WO | WO 02/31552 | 4/2002 |
| WO | 02/079829 | 10/2002 |

* cited by examiner 51 or 52

FIBER LASER

CLAIM OF PRIORITY

This application claims priority under 35 USC §119(e) to U.S. Patent Application Ser. No. 60/442,123, filed on Jan. 24, 2003, and Ser. No. 60/470,446, filed on May 15, 2003, the entire contents of which are hereby incorporated by reference.

TECHNICAL FIELD

This invention relates to lasers, and more particularly to fiber lasers.

BACKGROUND

Diode pumped fiber lasers have a long, thin geometry that allows better heat removal than the geometry of bulk solid state lasers. Currently, pump light, often piped through fibers from pump lasers, enters an outer core of the fiber laser, where it is confined and redirected to pass through an inner core of the fiber laser where it excites laser active material to produce and amplify light. Pump light may enter the fiber either through the end of the fiber or through the side of the fiber.

The output wavelength of many solid state lasers is between about 1-2 µm. Semiconductor materials can be doped with dopants such as Nd, Er, Yb, Vn to achieve a laser output within this wavelength range. Therefore, the following text assumes that the below-described fiber lasers have an output wavelength in this range. In case the output wavelength differs from this assumption, dimensions of the fiber laser are scaled appropriately with the output wavelength.

To convert pump light power into output laser power at the desired wavelength over the length of the fiber, a "double-clad fiber laser" has been used. Such a double-clad fiber laser typically consists of a single-mode core (for the output laser wavelength) that is embedded in a multi-mode cladding (for the pump laser wavelength), which itself can be embedded in an outer cladding.

The multi-mode cladding of a fiber laser has a diameter that is on the order of several ten to several hundred µm in diameter. The multi-mode cladding transmits the light from pump laser diodes that are either coupled in along the side of the fiber (i.e., an "side-pumped fiber laser") or are located at one or both ends of the fiber (i.e., an "end-pumped fiber laser").

The single-mode core is on the order of several Am in diameter and carries the lasing dopant. The dopant absorbs the pump wavelength and creates gain for the output laser wavelength inside the core. Because the core can only carry the lowest order waveguide mode with low losses, lasing in higher order modes does not occur, and diffraction-limited beam quality can be achieved from a single-mode fiber laser. The inner core, active region of such a single-mode fiber laser typically has a diameter that is chosen so that the lowest order Gaussian mode is the only mode that can propagate in the active core without substantial losses. In other words the diameter is chosen so that the cut-off frequency for any higher order mode but the lowest order Gaussian mode is above the lasing frequency of the active medium. Therefore these modes cannot propagate confined to the active core.

In general, for such a double clad fiber laser to work well, the pump wavelength should efficiently penetrate both the cladding and the core, while the output laser wavelength should be carried only in the core. The difference in the index of refraction between the core and the cladding layer ensures that the light of the output laser wavelength is confined to the core region.

For many material processing applications (e.g., cutting and welding of metals), high continuous wave ("cw") power (multi-kW) and high beam quality (near the diffraction limit) are desirable. The fiber geometry is well suited for multi-kW operation, because excessive heat can be efficiently removed over the length of the fiber. However, the radiation intensity $I_{min}$ (measured in Watts per square centimeter) within the fiber is proportional to the output power $P_L$ (measured in Watts) for a given laser wavelength, $$I_{min} \propto P_L,$$

and at very high intensities non-linear effects occur that effectively prohibit efficient laser operation. Because the diameter of the core of a typical single-mode fiber laser is limited by the wavelength of the output laser light, these conditions impose an effective upper power limit for single-mode, cw-operation, which currently is about 200 W.

SUMMARY

By reducing the size of an active region in which laser light is generated by a sufficient amount, the generated light is not confined by the active region of a fiber laser. When the gain of the fiber laser is low and/or when mode discriminators are used in the fiber laser, the fiber laser can operate as a single mode laser even when the generated light is transmitted in a multi-mode waveguide of the fiber laser.

In a first general aspect, an optical fiber for producing laser radiation at a characteristic wavelength includes a first multimode core region and an active region embedded within the core region for producing radiation at the characteristic wavelength when pumped by pump radiation. The core region is adapted for guiding the laser radiation in a longitudinal direction of the fiber and is adapted for guiding pump radiation. The active region has a sufficiently small transverse dimension such that radiation produced in the active region is not confined to the active region.

The invention may include one or more of the following features. For example, less than 50%, or less than 10%, or less than 5%, or less than 2% of the radiation produced at the characteristic wavelength in the active region can be confined in the active region. The transverse dimension of the active region can be smaller than the characteristic wavelength. The active region can have a second index of refraction different from the first index of refraction, and the combination of the transverse dimension of the active region and the difference between the first index of refraction and the second index of refraction can be such that the radiation produced in the active region is not confined to the active region.

The desired mode can be a lowest-order mode or a Gaussian mode of the fiber. The optical fiber can have a gain along its longitudinal direction that is sufficiently small so that a desired laser mode operates above a lasing threshold while all other modes operate below the lasing threshold.

The optical fiber can further include a mode discriminator or a mode discriminator means for discriminating against undesired modes of light generated in the multimode fiber while allowing a desired mode of light to propagate in the multimode fiber.

The mode discriminator can be a free space propagation path defined between a mirror and the first multimode fiber. The optical fiber can further include an optical element located in the free space propagation path, and the optical element can be adapted to transmit light emitted from the first multimode fiber in a desired mode and retroreflected by the mirror back into the multimode fiber. The optical element can be adapted not to transmit light emitted from the first multimode fiber in undesired modes back into the first multimode fiber. The optical element can be a lens.

The optical fiber can further include a second multimode optical fiber for guiding the laser radiation, and the mode discriminator can be a free space propagation path between the first multimode fiber and the second multimode fiber, or the mode discriminator can be a third multimode fiber located between the first multimode fiber and the second multimode fiber. When the mode discriminator is a free space propagation path, the optical fiber can further include an optical element located in the free space propagation path, and the optical element can be adapted to transmit light emitted from the first multimode fiber in a desired mode into the second multimode optical fiber. The optical element can be a lens. When the mode discriminator is third multimode fiber, the third multimode fiber can have an index of refraction that varies in the radial direction of the fiber.

The mode discriminator can be a tightly bent section of the optical fiber. The mode discriminator can be multiple tightly bent sections of the optical fiber, and the bent sections can lie in substantially in non-parallel planes. At least one tightly bent fiber section of the optical fiber can be bent substantially in the shape of a kidney.

In a second general aspect, a method of providing laser energy with a characteristic wavelength in a single optical mode to a surface includes pumping an active region embedded in a multimode optical fiber with pump energy to produce the laser energy with the characteristic wavelength and guiding the generated light to the surface with the multimode fiber. The active region has a transverse dimension smaller than the characteristic wavelength.

Unless otherwise defined, all technical and scientific terms used herein have the same meaning as commonly understood by one of ordinary skill in the art to which this invention belongs. Although methods and materials similar or equivalent to those described herein can be used in the practice or testing of the present invention, suitable methods and materials are described below. All publications, patent applications, patents, and other references mentioned herein are incorporated by reference in their entirety. In case of conflict, the present specification, including definitions, will control. In addition, the materials, methods, and examples are illustrative only and not intended to be limiting.

Other features and advantages of the invention will be apparent from the following detailed description, and from the claims.

DESCRIPTION OF DRAWINGS

Like reference symbols in the various drawings indicate like elements.

DETAILED DESCRIPTION

Figure 1A:
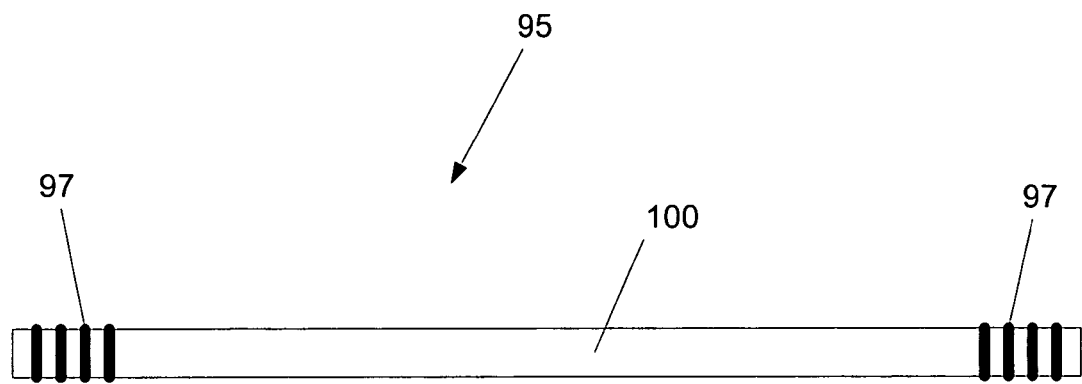
FIG. 1a is a schematic view of a cylindrical fiber laser.

A fiber laser can transport laser radiation in a mostly passive waveguide having a cross section that is large compared to the wavelength of the laser radiation. The large waveguide cross section reduces the radiation intensity within the waveguide to values that allow multi-kW output power without the occurrence of non-linear effects. To prevent multi-mode operation of the laser, the gain of the device is reduced to a value slightly above the threshold for the lowest-order mode. Higher order modes are suppressed through the use of one or more mode discriminator sections and/or the use of a laser resonator that increases the losses of higher-order modes relative to the lowest order mode. The reduction of the gain is achieved by significantly reducing the size of the active medium and the overlap of the lasing mode with the active medium within the fiber.

In the fiber laser systems described herein, the power limit of the laser typically is not determined by thermal considerations, as is the case with many other, non-fiber, types of lasers. Instead, the power output of a fiber laser is limited by the intensity of the beam at which non-linear scattering occurs. Thus, in general, multi-kW, single-mode operation of a fiber laser is achieved in a fiber in which the pump light and the output laser light share the same multi-mode fiber core, and the active (doped) medium is restricted to one or more region(s) that are so small that not even the lowest order mode of the output laser wavelength can be confined in the region (s). This can be achieved, for example, when the dimension of the active region(s) is/are smaller than the wavelength, $\lambda$, of the output laser beam. Because the beam is not confined to the active region, it can have a spatial profile that is defined by the dimensions of the multi-mode fiber core, which typically are much larger than the dimensions of a single-mode fiber core. The increased beam profile allows the fiber laser to produce multi-kW output powers without increasing the intensity within the fiber to a level at which non-linear effects occur appreciably.

Furthermore, the small cross section of the active region reduces the overall gain within the fiber. Because of the low gain, many round trips within the laser cavity are required for the laser beam to reach its peak operating power. Thus, small differences in the net gain for different modes leads to effective mode discrimination between the modes. The active regions and their respective dopant concentrations can be distributed in such a way that light produced in the active region(s) couples preferably to a low-order mode while discriminating against higher-order modes. Furthermore, the active region(s) can be distributed in the multi-mode core in such a way as to reduce the occurrence of local pump light modes within the multi-mode core that avoid overlap with the active region(s) and thereby reduce the pumping efficiency. Additionally, the index of refraction, $n_1$, of the active regions may be index matched to the index of the fiber core region, $n_2$, surrounding the active regions to reduce scattering of pump light away from the active regions. However, the index of refraction $n_1$ does not have to have any relation to $n_2$ and/or the index of refraction of the cladding region, $n_3$, that surrounds the core. Discrimination of higher-order modes can be achieved by utilizing the higher coupling losses of higher-order modes within one or more mode discriminator sections within or between fiber sections or at the ends of the fiber.

Referring to FIG. 1a, a fiber laser (95) can be created from an optical fiber (100) that has a laser active medium that emits radiation with a wavelength characteristic of the active medium within the fiber when energy is supplied to the active medium (e.g., by "pump" radiation). Two reflectors (97) define a resonant optical cavity in the fiber (100) in which radiation can oscillate and cause the stimulated emission of radiation from the active medium in the fiber. When the optical gain induced by stimulated emission of radiation is greater than the optical loss in the cavity, overall amplification is experienced, and radiation builds up in the cavity while the fiber "lases." The reflectors (97) can be, for example, Bragg gratings written in the fiber (100) or mirrors that can be placed outside the fiber (100). At least one of the reflectors (97) can be partially transmitting, so that radiation is coupled out of the resonant cavity.

Figure 1B:
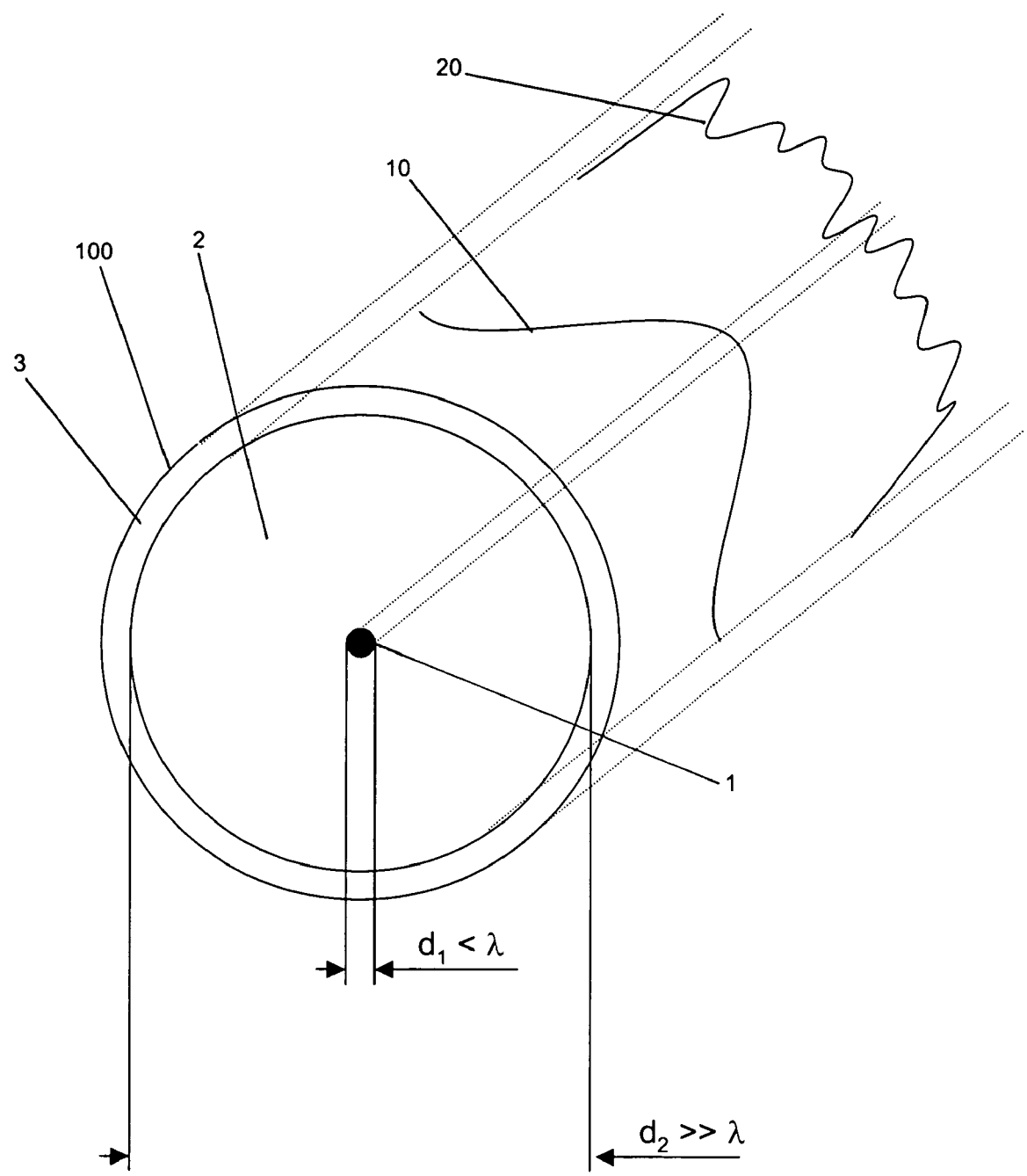
FIG. 1b is a schematic cross-sectional view of a cylindrical fiber laser.

Referring to FIG. 1b, an optical fiber (100) includes a multimode core region (2) that carries the multi-mode pump light (20), represented by a spiky, multimode intensity distribution, and the fiber laser output light (10), represented by the diffraction-limited, Gaussian intensity distribution. To guide the pump light and the fiber laser light, the fiber core is embedded in a cladding (3) that ensures effective waveguiding because the cladding has an index of refraction, $n_3$, that is less than the index of refraction of the core, $n_2$, for both the pump and the laser wavelength. Generally, $n_2 > 1$, and the outer cladding layer therefore can be air or vacuum, with $n_3 = 1$. While the intensity distribution of the fiber laser output light (10) is shown as a Gaussian mode, any other desirable low-order mode is possible by discriminating all undesired modes and providing low propagation losses within the fiber (100) only for the desired mode (e.g., a donut mode or $TEM_{01*}$ mode).

Inside the fiber core (2) of the optical fiber is an active region (1) for generating light at the laser wavelength when pumped with pump light. Although one active region (1) is shown in FIG. 1b, multiple active regions (1) can be distributed within the fiber core (2). To ensure that radiation generated in the active region is not confined to the active region (1) at least one dimension of the active region (1) is smaller than the size of the lowest-order mode with an output wavelength $\lambda$. For example, for a cylindrical active region (1) embedded within the fiber core (2), the diameter, $d_1$, of the active region (1) can be smaller than the wavelength, $\lambda$, of the laser output. The small dimension of the active region (1) effectively suppresses the confinement of laser modes inside the active region (1).

In the more general case, it is not only the size of the region that can confine and guide radiation within the region, but the index contrast of the region with the a surrounding region. For example, in a cylindrical fiber having a active region with a radius, r, and an index of refraction $n_1$, surrounded by a cladding with an index of refraction $n_2$, and carrying radiation with a wavelength $\lambda$, the active region will support only the lowest order mode when $r(n_1^2 - n_2^2)^{1/2} < 2.405 \lambda / 2\pi.$ As $r(n_1^2 - n_2^2)^{1/2}$ becomes smaller than this value, a greater proportion of the field leaks out of the active region and into the cladding. When more than about 50% of the intensity of the lowest-order mode is located outside the active region, the active region cannot be said to confine the mode.

The index of refraction, $n_1$, of the active region (1) can be index matched to the fiber core region ($n_1 = n_2$), but $n_1$ need not have any particular relation to $n_2$ and/or $n_3$ for either the pump and/or the output laser wavelengths. When the index of refraction of the active region (1) is index matched to the fiber core region, the active region does not confine the generated radiation by index guiding. The diameter, $d_2$, of the core region (2) is larger than the wavelength, $\lambda$, of the laser output. The diameter of the core region (2) can be sufficiently greater than the wavelength, $\lambda$, that multiple, non-zeroth-order, modes can propagate in the fiber. For example if $\lambda = 1$ μm, $d_2$ can be about 3-50 μm.

Figure 1C:
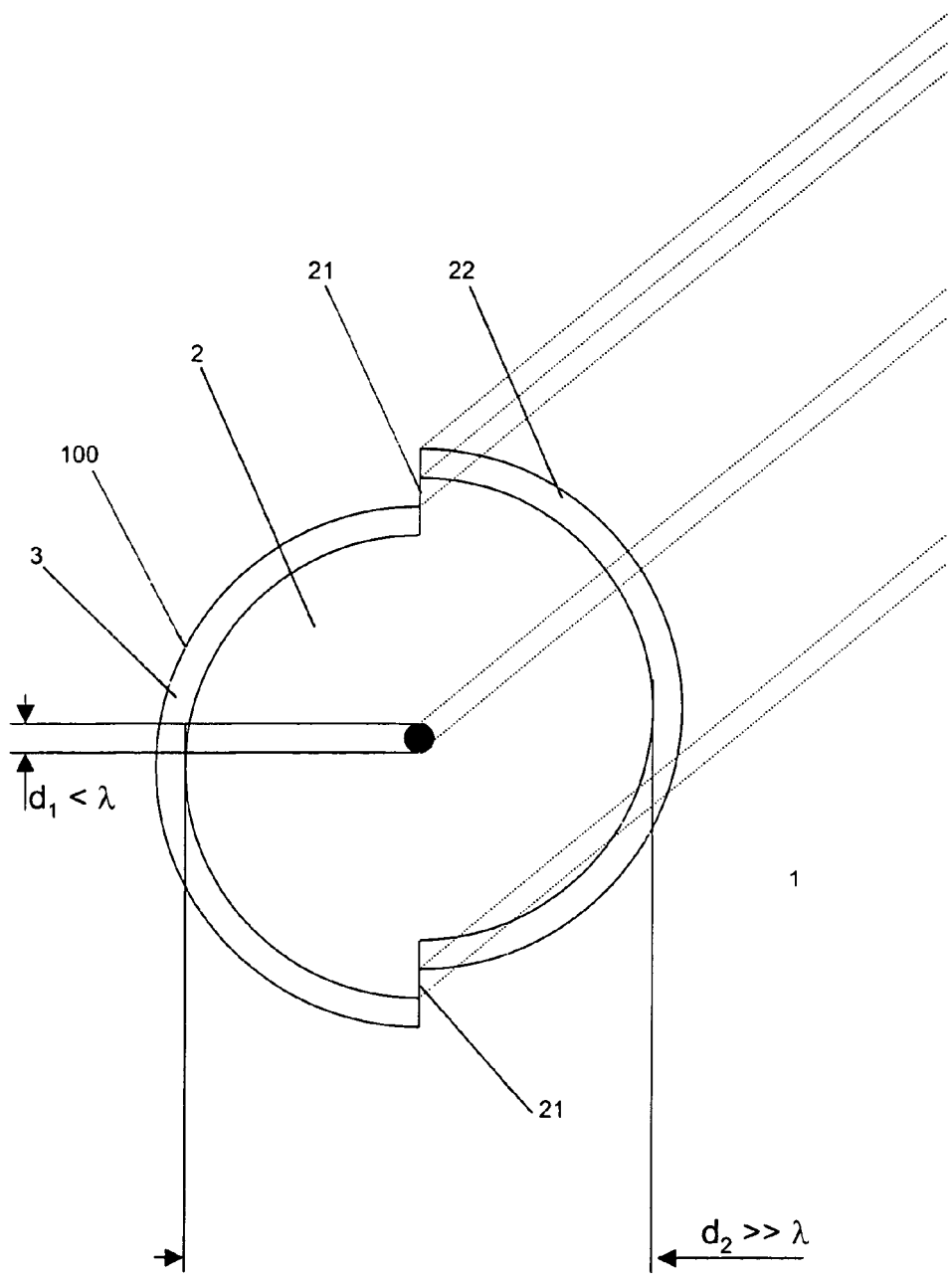
FIG. 1c is a schematic cross-sectional view of a cylindrical fiber laser.

Referring to FIG. 1c, circular symmetry of the fiber core (2) can be broken by separating the fiber core (2) into two semicircles and displacing one of them with respect to each other. A fiber (100) having such a shape, or other similar shapes having a planar window surface (21) substantially parallel to the radial axis of the fiber (100), can be useful for effective side pumping of the fiber (100) through one or more surfaces (21) that are created along the fiber sides. When pump light enters the fiber (100) through planar surface (21), the pump light is totally internally reflected by the curved outer surface (22) of the fiber (100) and is diffused throughout the interior of the fiber (100). Fiber core (2) can have a circular cross section, as shown in FIG. 1b, but can also have other, non-circular cross sections, such as that shown in FIG. 1c, or shown and described in U.S. Pat. Nos. 6,101,199, 5,533,163, 4,829,529, and 4,815,079, which are herein incorporated by reference. A fiber core (2) with a broken symmetry can be useful for efficient fiber pumping, because the broken symmetry suppresses the build-up of local modes in the pump light field that is injected into the fiber (100).

Fiber (100) may be fabricated using standard techniques known in the art. For example, a preform may be created using a variety of techniques (e.g., by depositing fused-silica soot on the inside wall of a fused-silica tube and then sintering the resultant tube to form a rod; by depositing fused-silica soot on the on the outside of a ceramic rod, cooling the resulting the structure, extracting the rod, and sintering the resultant tube to form a rod; or by vapor axial deposition of fused-silica soot on a pure silica seed rod to form a rod). The preform is cut to the desired cross-sectional shape of the fiber by milling or cutting the preform. For example, a cylindrical preform may be cut in half along its longitudinal axis and the two semi-cylindrical halves may be reattached to each other by sintering the two halves together in an offset position from each other to create the cross section desired in the final fiber. A fiber is then drawn from the preform using known techniques and the cross-section of the drawn fiber retains the cross-sectional shape of the preform from which it is drawn.

The active (1) region can be slightly displaced from the center of the fiber core (2), so that it is not broken when the halves of the core (2) are separated.

Figure 1D:
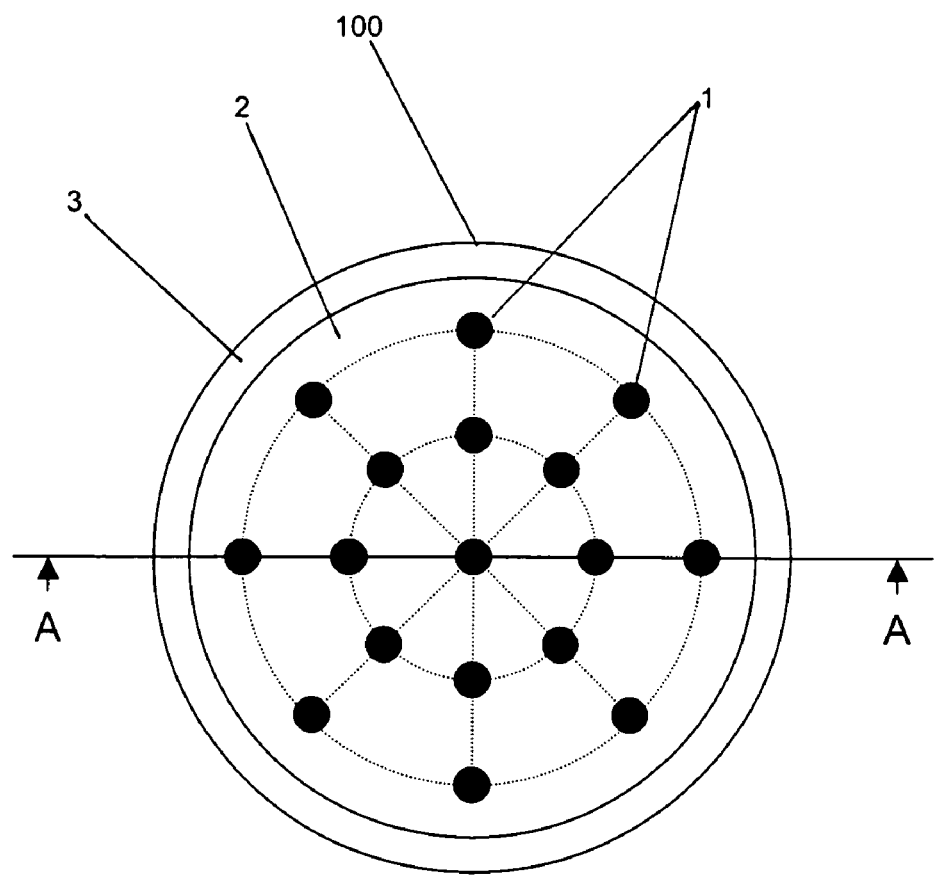
FIG. 1d is a schematic cross-sectional view of a cylindrical fiber laser.
Figure 1D:
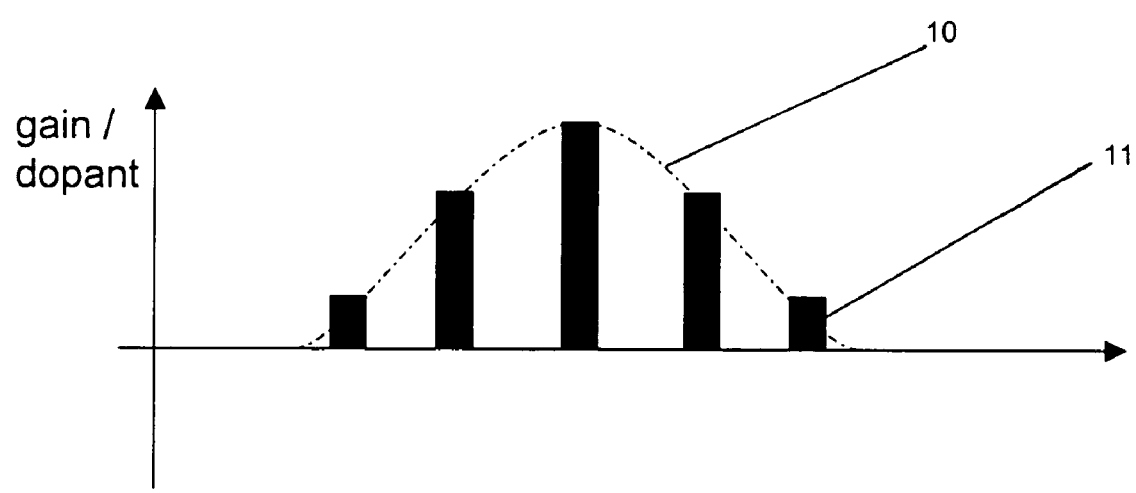

Referring to FIG. 1d, multiple active regions (1) can be distributed throughout the core (2). Each active region (1) has a dimension (e.g., a diameter) and an index contrast with the surrounding core (2) such that radiation generated in the active regions (1) is not confined by the active regions (1). The dopant concentration (11) of the individual active regions (1) can differ depending on the location of the individual active region (1) within the core (2). For example, a relatively larger concentration of dopant can be located near the center of the core (2) than at the perimeter of the core (2), such that the total gain over the entire cross section of the core (2) created by the individual active regions (1) stepwise matches the intensity distribution of a desired low-order fiber laser mode (10).

Figure 1E:
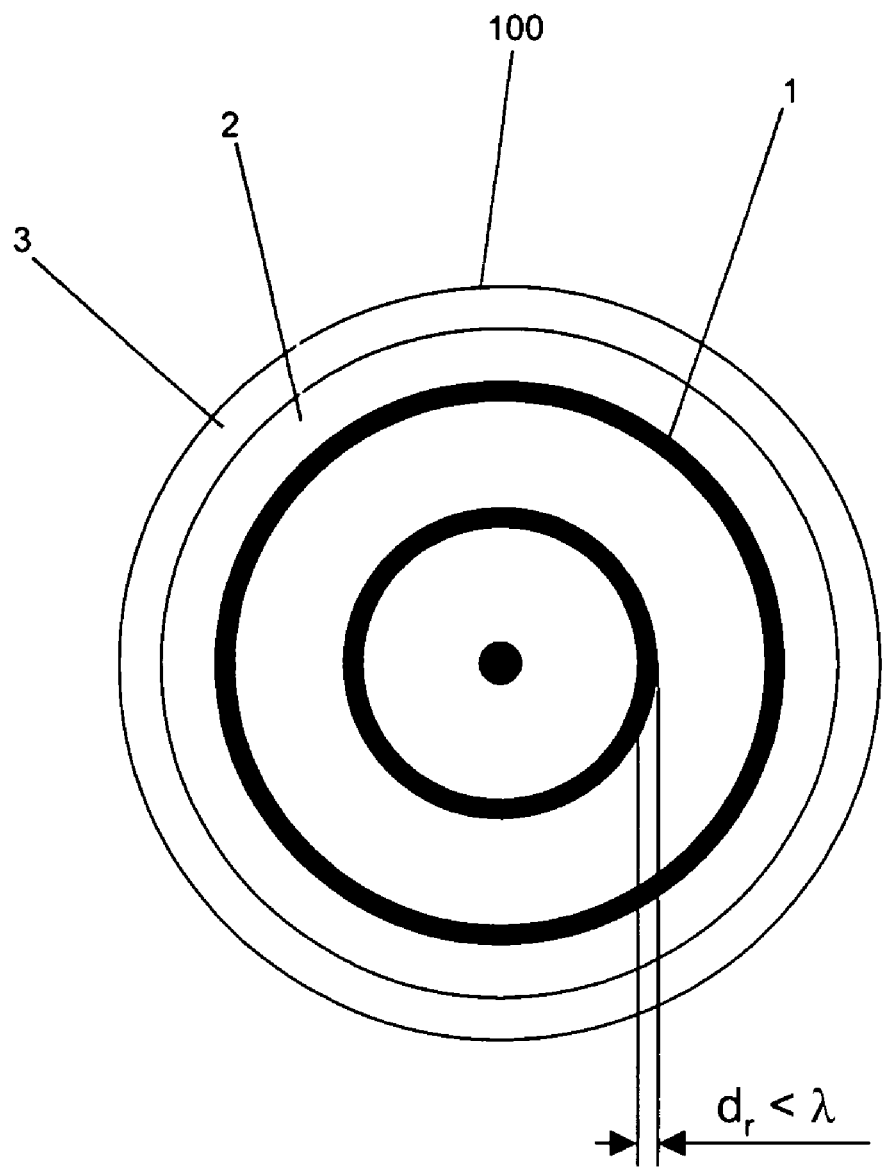
FIG. 1e is a schematic cross-sectional view of a cylindrical fiber laser.

Referring to FIG. 1e, a fiber (100) includes a cladding (3), a core (2), and multiple active regions (1) that are arranged in the form of thin concentric rings. The ring thickness $d_r$ and its index contrast with the surrounding material is such that radiation is not confined within the individual active regions (1). The dopant concentration of the different rings can be chosen to match the spatial mode profile of a desired mode. For example, to match a Gaussian mode, the axial active region will have a higher dopant concentration than the outermost ring. The ring-shaped active regions (1) need not be of circular shape, and they do not have to be concentrically located or located inside each other at all.

Figure 1F:
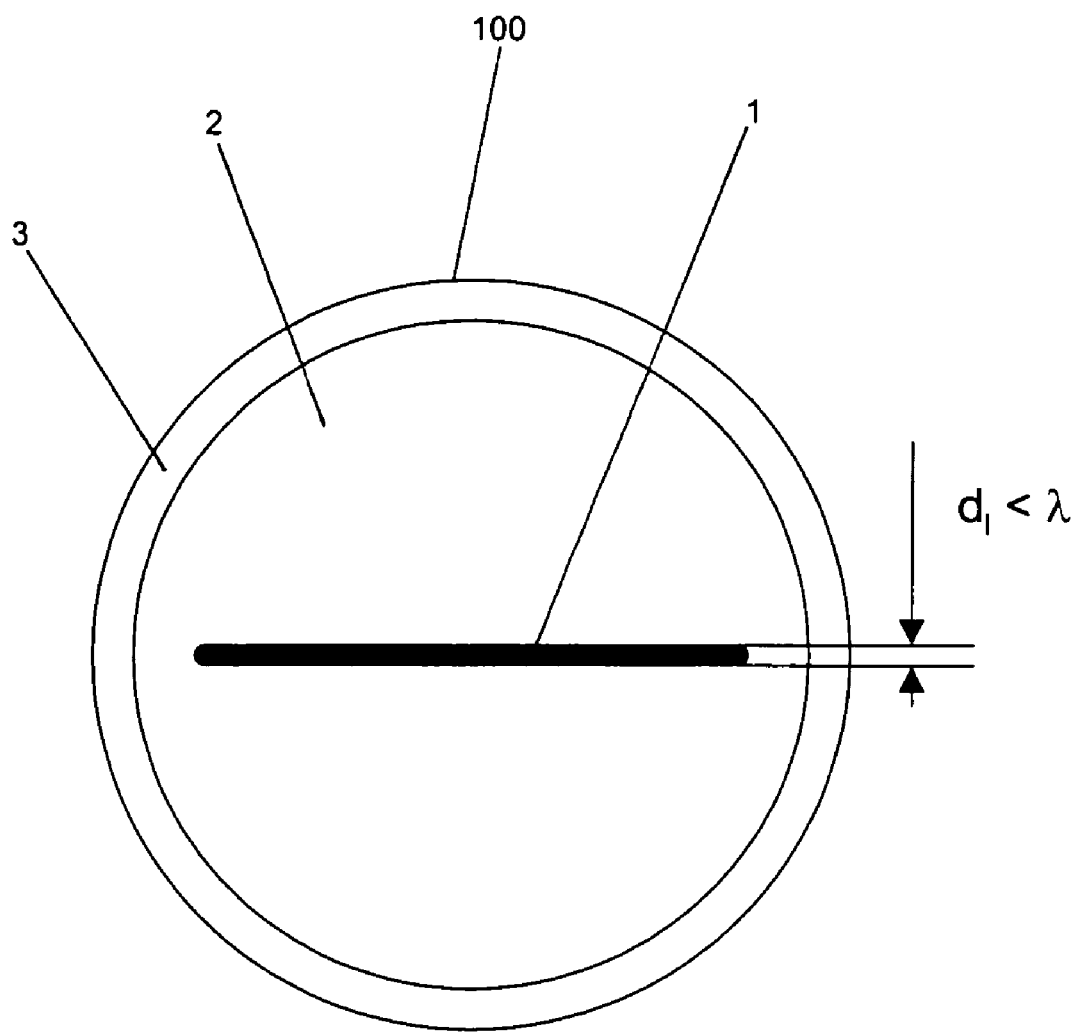
FIG. 1f is a schematic cross-sectional view of a cylindrical fiber laser.

Referring to FIG. 1f, a fiber (100) includes a cladding (3), a core (2), and a thin slab of active material (1). The thickness, $d_1$, of the straight or curved slab of active material (1) has a thickness and an index contrast with the surrounding core material (2) such that radiation is not confined within the active material.

Naturally, the multitude of active regions (1) distributed within the fiber core can consist of any combination of the basic shapes described above with reference to FIGS. 1b-FIG. 1f.

Figure 2A:
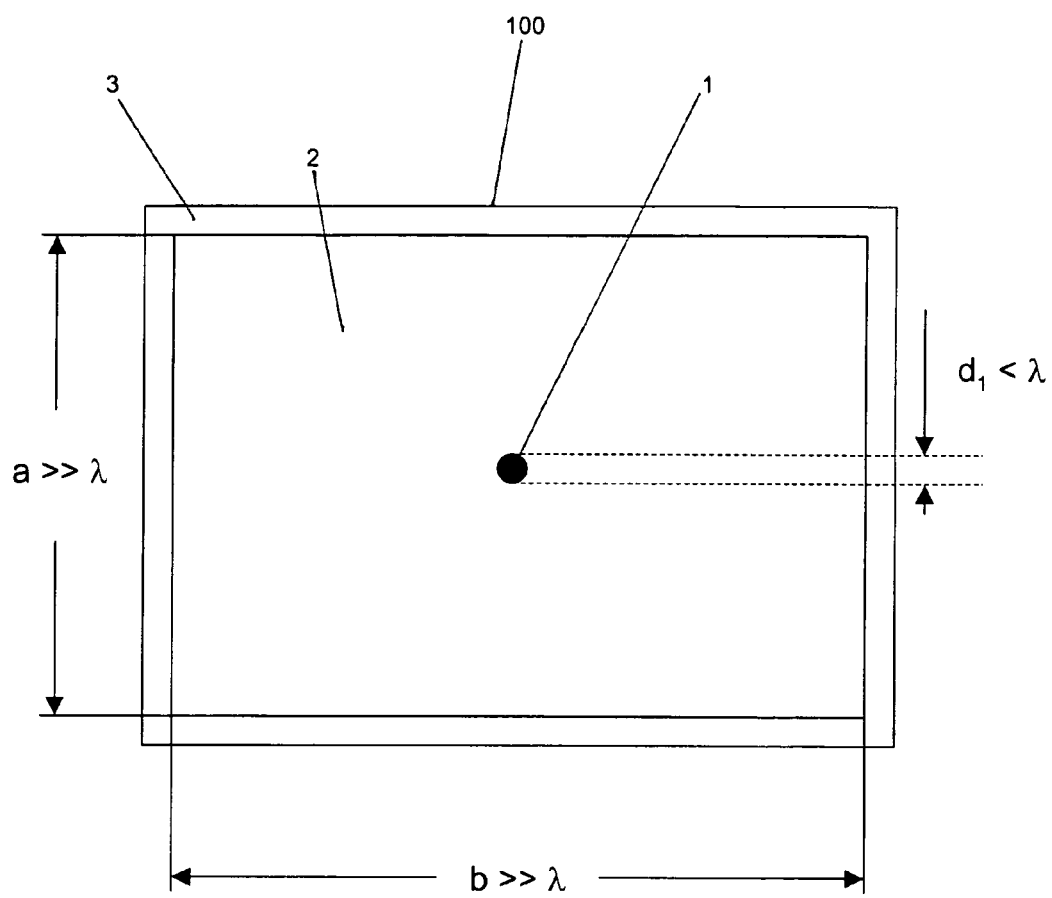
FIG. 2a is a schematic cross-sectional view of a rectangular fiber laser.
Figure 2B:
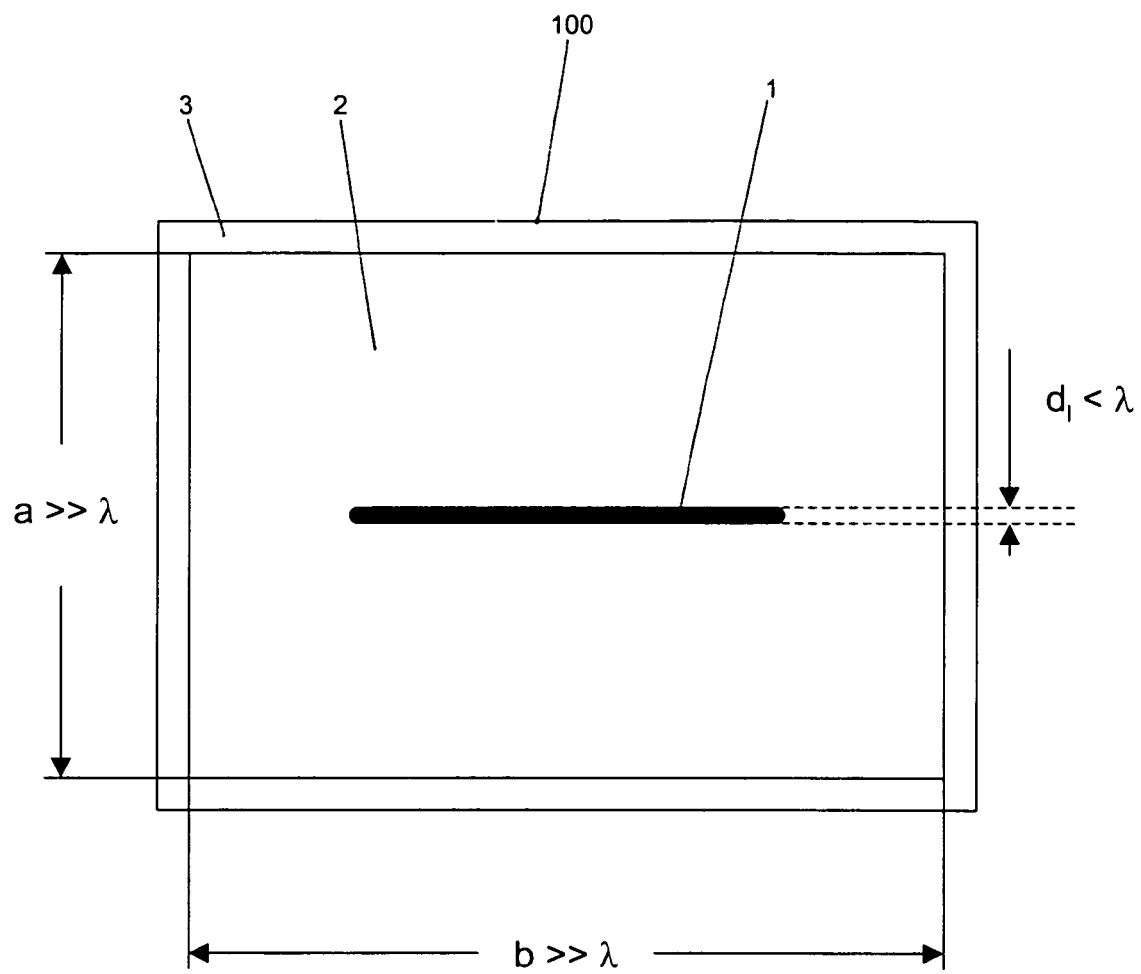
FIG. 2b is a schematic cross-sectional view of a rectangular fiber laser.

Referring to FIG. 2a, a fiber (100) includes a cladding (3), active material (1), and a fiber core (2) that can have a rectangular shape, which can be beneficial for diode pumping the fiber laser. Both dimensions (height, a, and width, b) of the rectangular fiber core (2) are large enough compared to the fiber laser output wavelength λ to allow for multimode propagation of pump light in the core (2). While all shapes and combination of shapes described above with reference to FIGS. 1b-1f are possible for the active regions (1), the linear active region is separately shown in FIG. 2b because the linear geometry is especially suited for the rectangular waveguide as shown. For a fiber laser having an output wavelength of λ=1 μm, the height and/or the width of the rectangular fiber core can be about 3-50 μm.

Figure 3A:
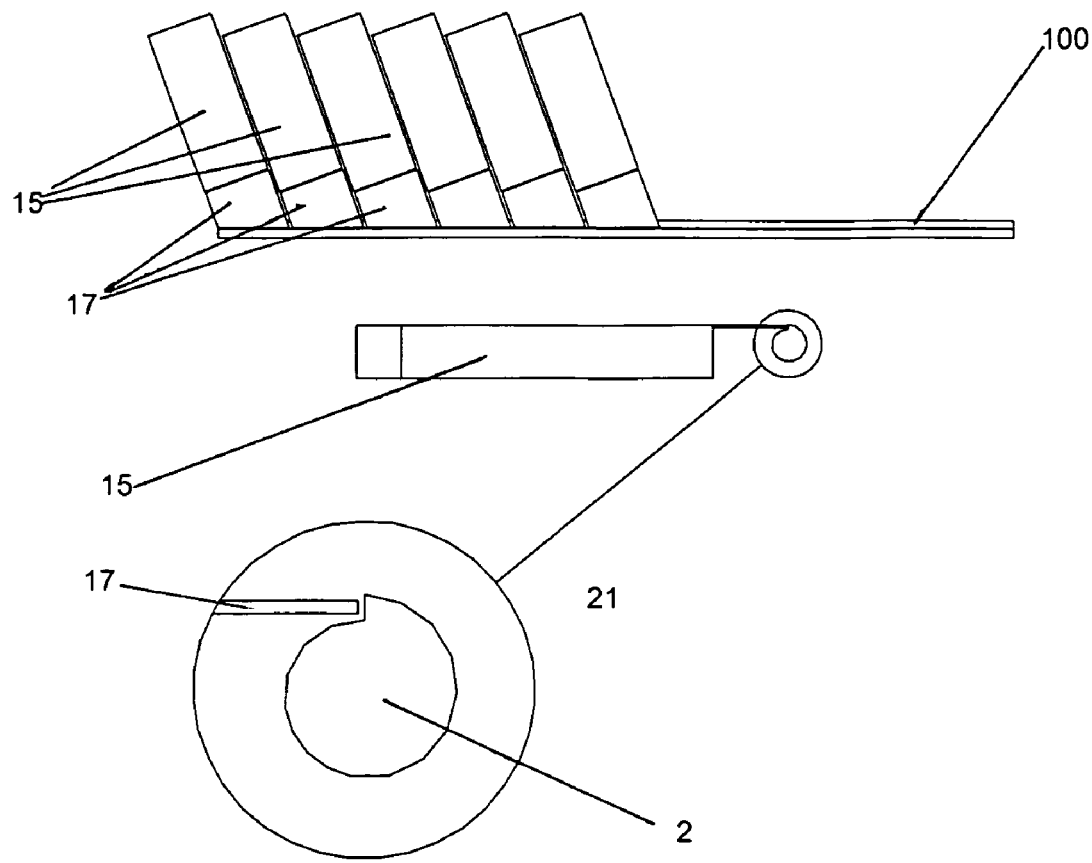
FIG. 3a is a schematic view of a side-pumped fiber laser.
Figure 3A:
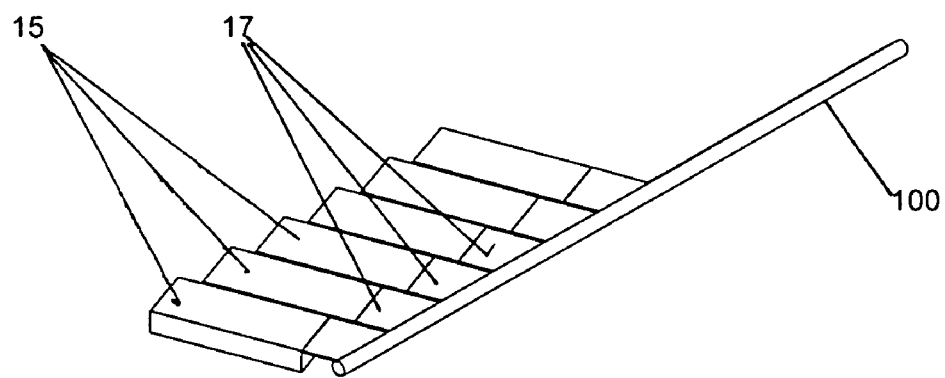

Referring to FIG. 3a, multiple high-power diode lasers (15) can be used to create the pump radiation that is used to excite the active region(s) within the fiber (100). Pump radiation can be injected into the fiber (100) through the sidewall of the fiber. For example, pump laser radiation can be coupled through passive, planar glass plates (17) to a planar window (21) etched, cut, or otherwise formed in the fiber (100). The pump radiation is coupled through the window (21) and into the core (2) of the fiber (100). While the high power diode lasers are shown to be adjacent to each other, this is not necessary. The distance between any two diode laser can be chosen to best fit the needs of the fiber laser.

Figure 3B:
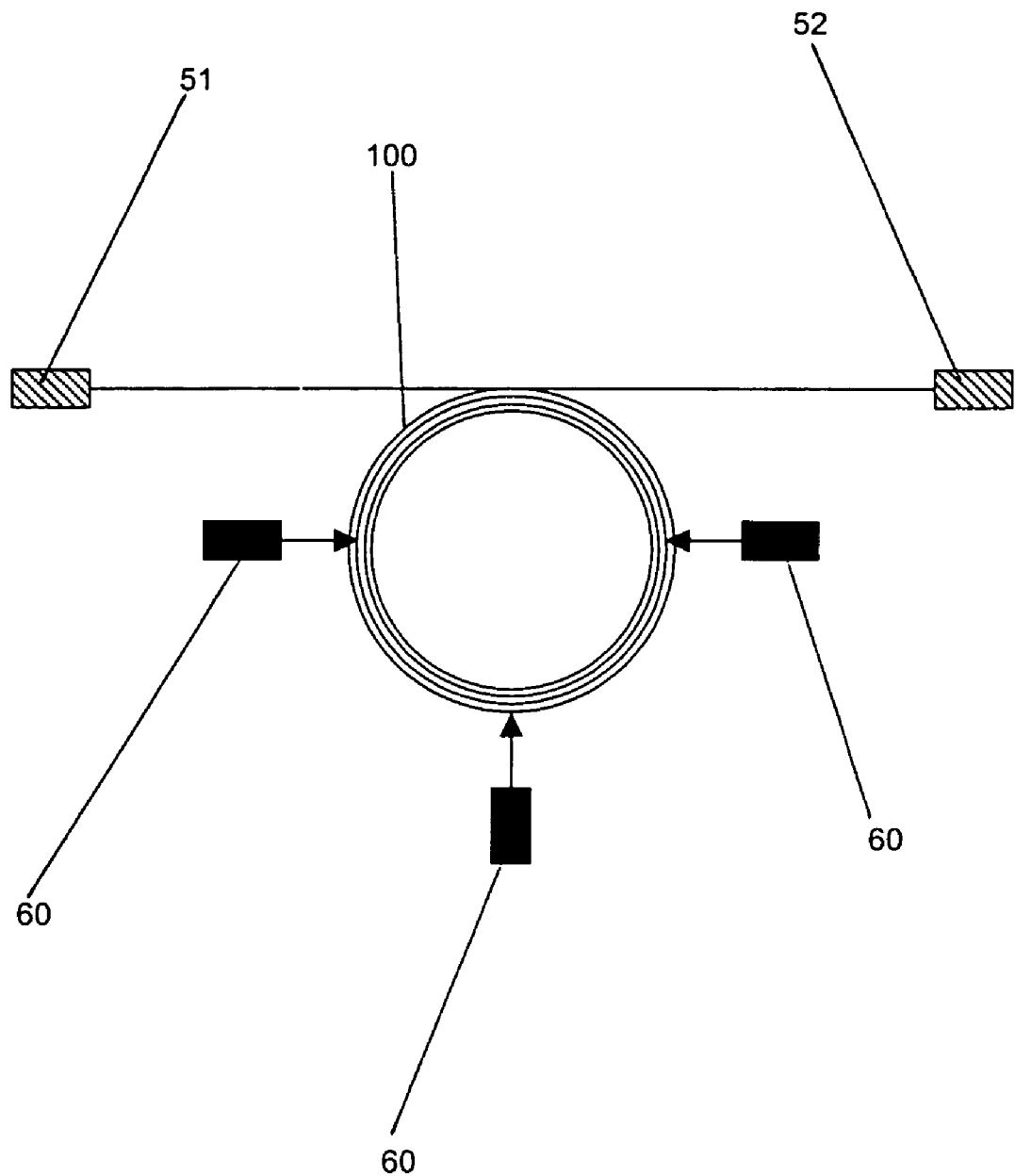
FIG. 3b is a schematic view of a side-pumped fiber laser.

Referring to FIG. 3b, the fiber laser (100) can be side-pumped with one or more multimode diode lasers (60) distributed along the fiber laser that can be wound in overlapping loops, such that a single pump diode laser (60) can inject light into more than one loop of fiber. The semi-transparent outcoupling mirror (51) and the reflective rear mirror (52) provide low loss feedback for the desired low order fiber laser mode (10). All pumping techniques can be used to pump the fiber laser (100). For example, the fiber laser (100) can be pumped by a multitude of spliced fiber bundles, by shining pump light in to a v-groove in the fiber (100), or by shining pump light through a side facet (21) in the fiber (100).

Figure 3C:
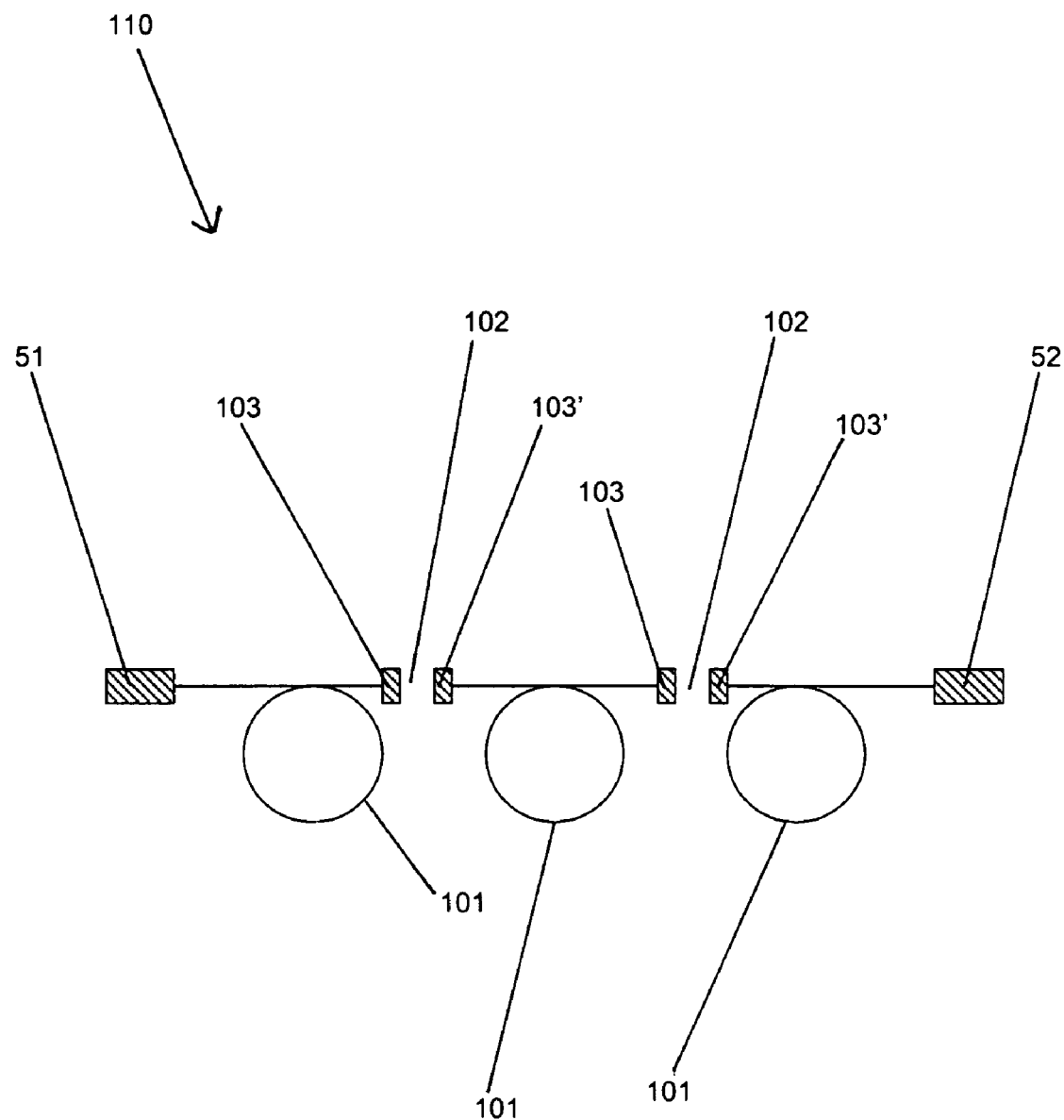
FIG. 3c is a schematic view of a fiber laser with sections of the laser separated by free space propagation regions.

Referring to FIG. 3c, to prevent undesired modes from resonating in the fiber laser (110) the fiber laser (110) can be separated into different sections (101) that are separated by free space propagation paths (102). At a fiber coupling (103), the fiber laser mode leaves the fiber section (101) with a divergence that is characteristic for the mode. The laser radiation will propagate in the free space propagation path (102) until it couples to the next fiber section (103'). While low-order modes with low divergence can bridge the free space propagation path (102) without high coupling losses, higher-order modes will suffer substantial coupling losses and will thereby be effectively suppressed. This ensures low-order mode laser operation within the multimode fiber core of the fiber laser (110).

Figure 3D:
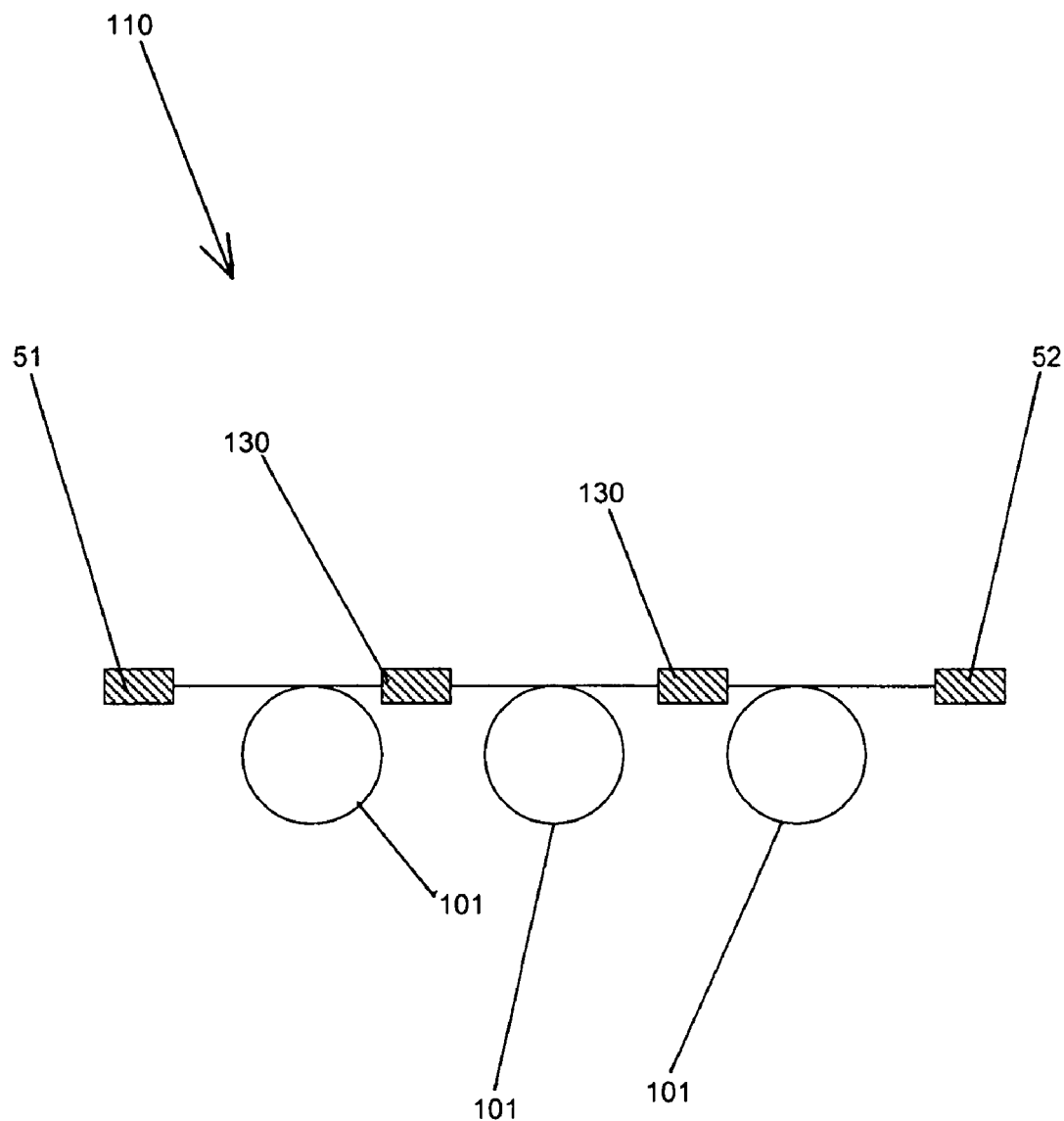
FIG. 3d is a schematic view of a fiber laser with sections of the laser separated by mode discriminator sections.

Referring to FIG. 3d, a fiber laser (110) can be separated into different sections (101) that are separated by distributed mode discriminator sections (130). These distributed mode discriminator sections (130) function to allow low order modes with low divergence to pass the distributed mode discriminator sections (130) without high losses, while higher order modes suffer substantial losses and will thereby be effectively suppressed. This ensures low order mode laser operation within the multimode fiber core (2). The mode discriminator sections (130) are specified in more detail below.

Figure 4A:
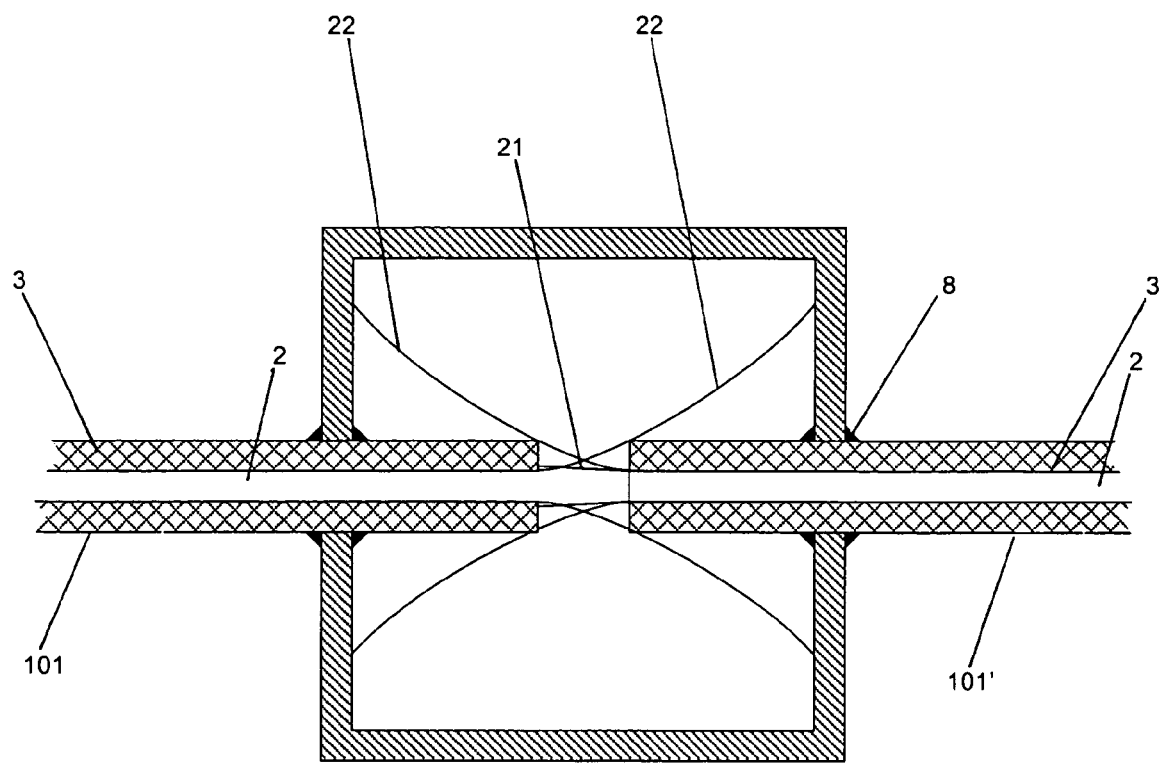
FIG. 4a is a schematic side view of a mode discriminator section.

FIG. 4a shows a mode discriminating section (130) as two fiber sections (101 and 101') having a fiber core (2) and a fiber cladding (3), which are held in a housing (80) and are separated from each other by a free space propagation path. The desirable lowest order mode (21) exists in one of the fiber sections (101) and propagates in free space with a low divergence to the entrance of the other fiber section (101'). During the out- and in-coupling and the free space propagation, this mode suffers very small losses that do not greatly reduce the efficiency of the laser operation for this mode (21). However, higher order modes (22) suffer substantial losses during the coupling through the free space propagation path because the larger divergence of the higher order mode prohibits efficient coupling to the next fiber section (101'). Because the laser resonator contains light propagating in both directions in the fiber laser (110), the techniques and devices described above are also valid for light propagating in the other direction (from section (101') to section (101)). When the fiber ends are placed inside the housing (80), their exposed ends within the housing (80) can be sealed from dust using state of the art sealants and sealing techniques (8).

Figure 4B:
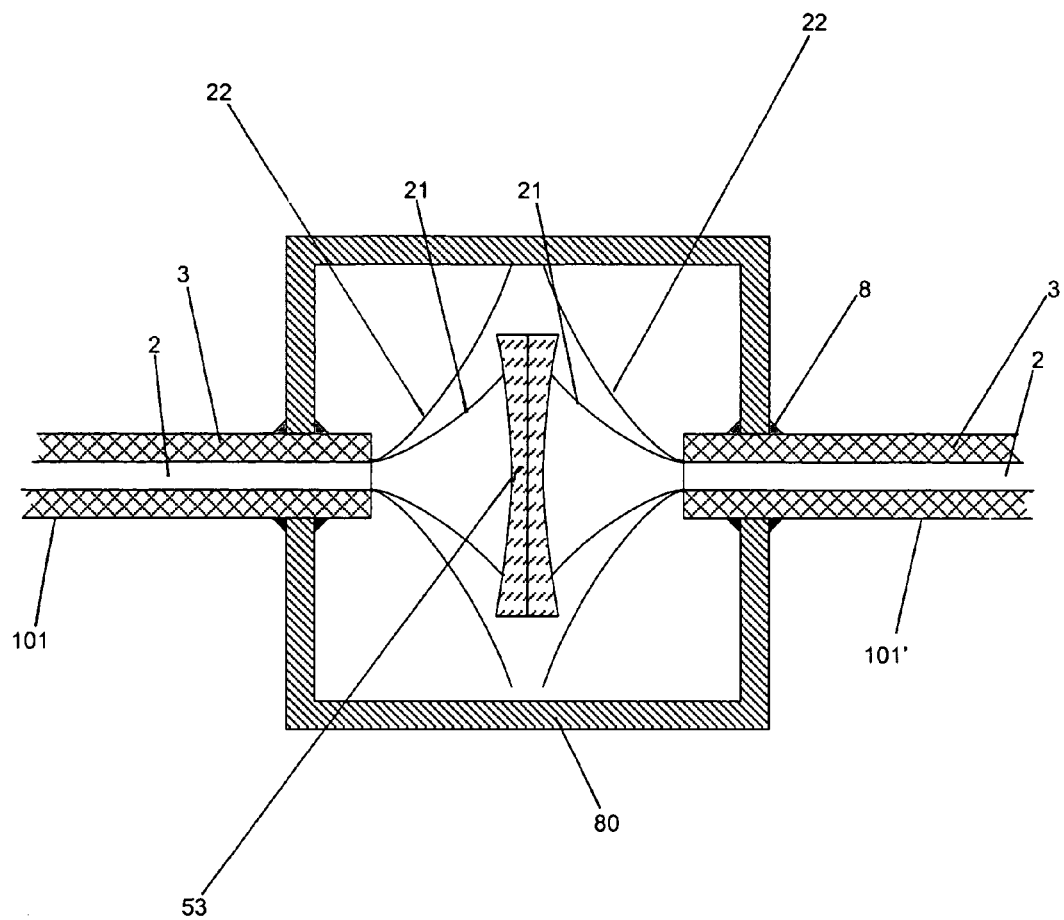
FIG. 4b is a schematic side view of a mode discriminator section.

FIG. 4b shows a mode discriminating section (130) as two fiber sections (101 and 101') having a fiber core (2) and a fiber cladding (3), which are held in a housing (80) and are separated from each other by a free space propagation path. In addition, an optical element (53) (e.g., a lens) is located within the free space propagation path between the two fiber sections (101 and 101') to efficiently couple the desired low order mode (21) while also efficiently discriminating unwanted modes (22). Due to the optical element (53), the coupling efficiency for the desired mode (21) is enhanced, because light emerging from the end of one fiber section (101) can be optically imaged to the end of the other fiber section (101'). The optical element (53) can also be used to discriminate against the lowest order mode, while efficiently coupling a desired higher order mode from one fiber section (101) to another fiber section (101'). For example, the optical element (53) can consist of one or more lenses that increase the divergence of the lowest order mode to reduce coupling of the lowest order mode from one fiber section (101) to another (101'), while optimizing the coupling efficiency for a desired higher order mode.

Figure 4C:
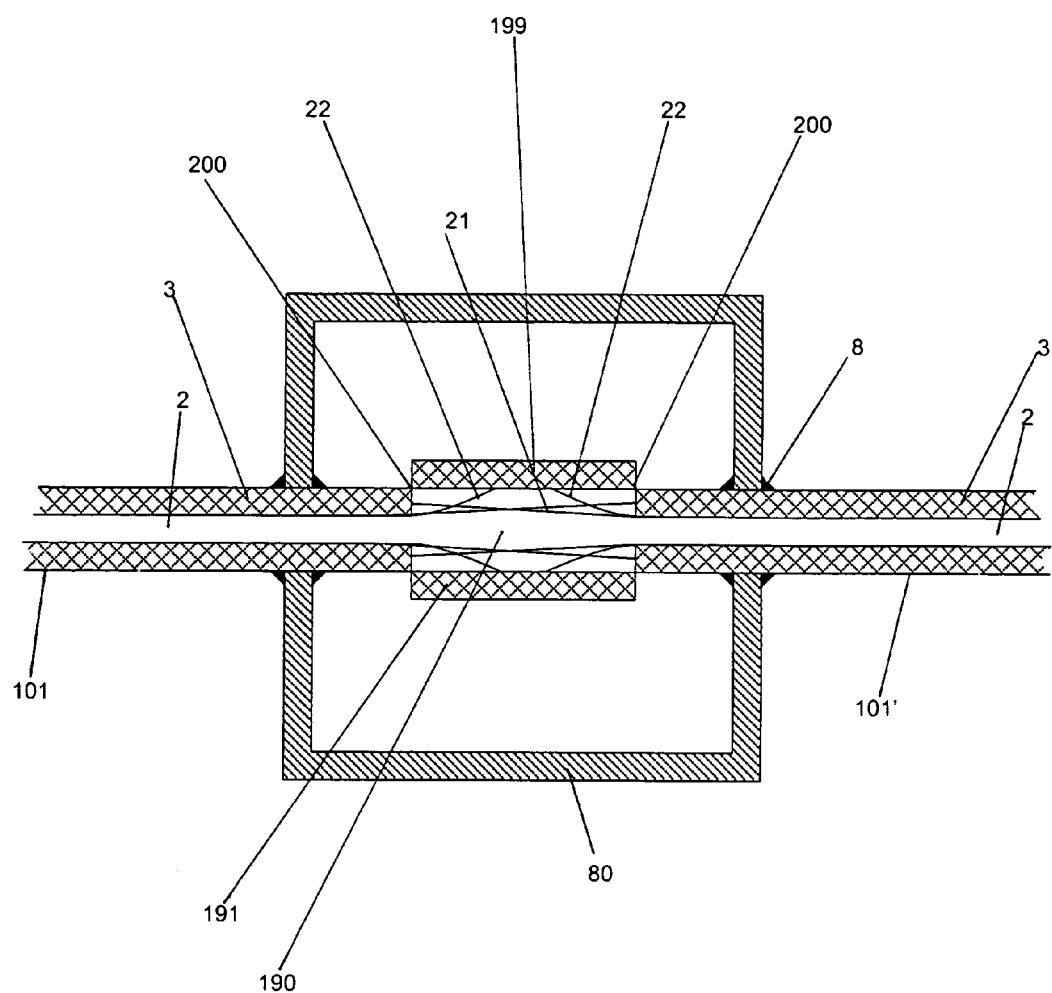
FIG. 4c is a schematic side view of a mode discriminator section.

FIG. 4c shows a mode discriminating section (130) as two fiber sections (101 and 101') having a fiber core (2) and a fiber cladding (3), which are held in a housing (80) and are separated from each other by a third fiber section (199), having a core (190) and a fiber cladding (191), that is spliced to the fiber sections (101) and (101') at positions (200). The cross section of the core (190) is larger than the cross section of core (2) of fiber sections (101) and (101'). The desirable lowest order mode (21) passes through fiber section (199) with a low divergence and therefore with low loss. However, higher order modes (22) suffer substantial losses during passing fiber section (199) because they diverge quickly in core 190.

Figure 4D:
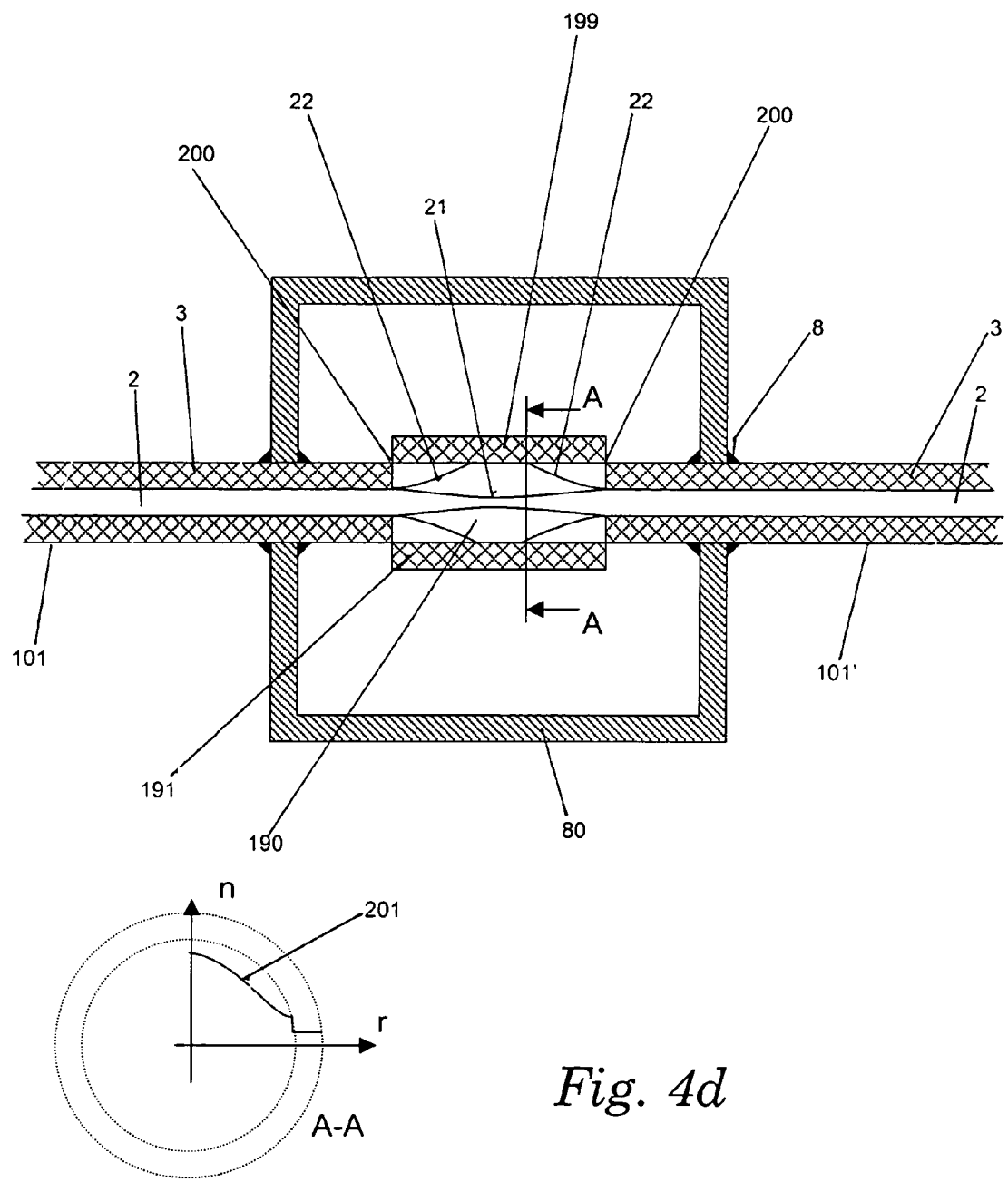
FIG. 4d is a schematic side view of a mode discriminator section.

FIG. 4d shows a mode discriminating section (130) similar to the one described in FIG. 4c, but the index of refraction (201) of the core (190) of the discriminating fiber section (199) varies radially. The index of refraction can vary, for example, smoothly from a higher value on the axis of the core 190 to a smaller value at a distance from the center of the core, as is shown by the graph in FIG. 4d. This index of refraction profile will act as a conduit for low order modes and therefore decrease their losses during the pass of fiber section (199), while increasing the losses of higher order modes by increasing the divergence of the higher order modes. The cladding (191) can have a smaller value of index of refraction than the core (190).

Figure 4E:
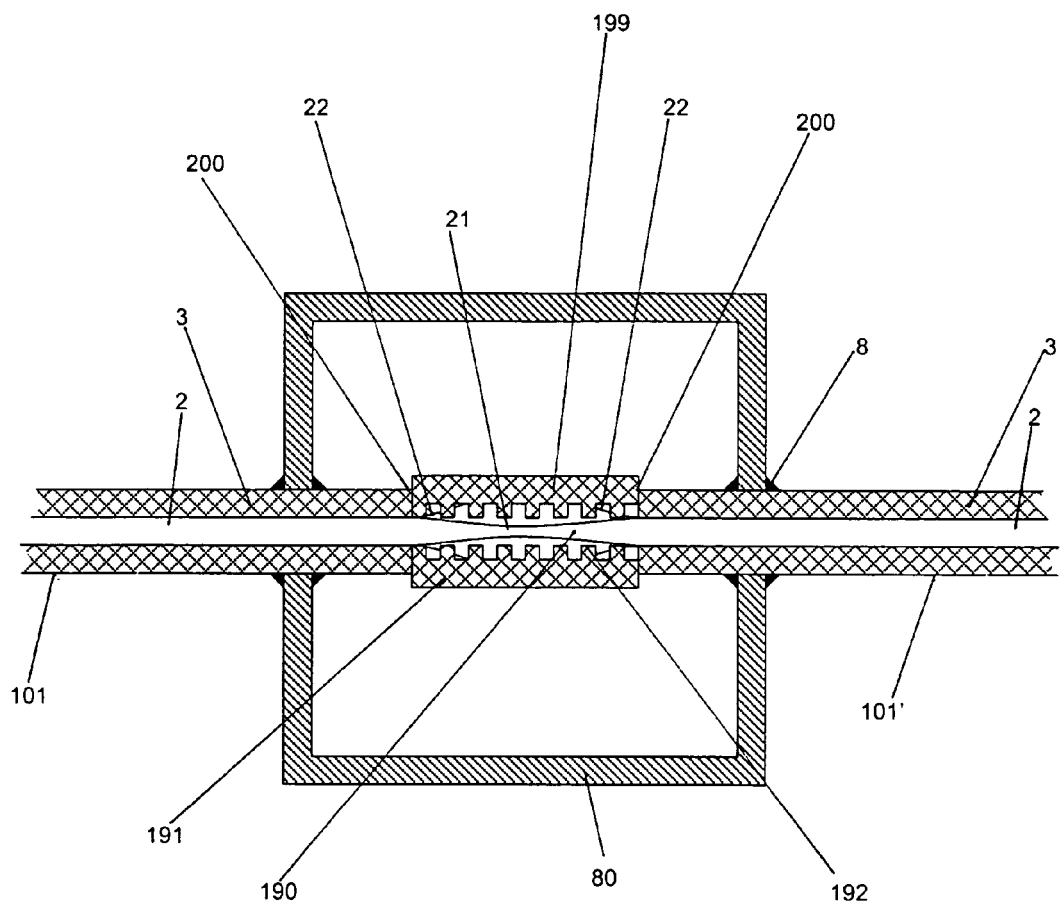
FIG. 4e is a schematic side view of a mode discriminator section.

FIG. 4e shows a mode discriminating section (130) similar to the one described in FIG. 4c, but the discriminating fiber section (199) can include a fiber grating (192) that increases the losses of undesired modes (22) (e.g., high divergence modes), while allowing a desired mode (e.g., a low divergence mode) to pass with low loss. The grating (192) can act like a conduit for low order modes and therefore even decrease their losses during the pass of fiber section (199), while it increases the losses of the higher order modes by increasing their divergence.

Figure 4F:
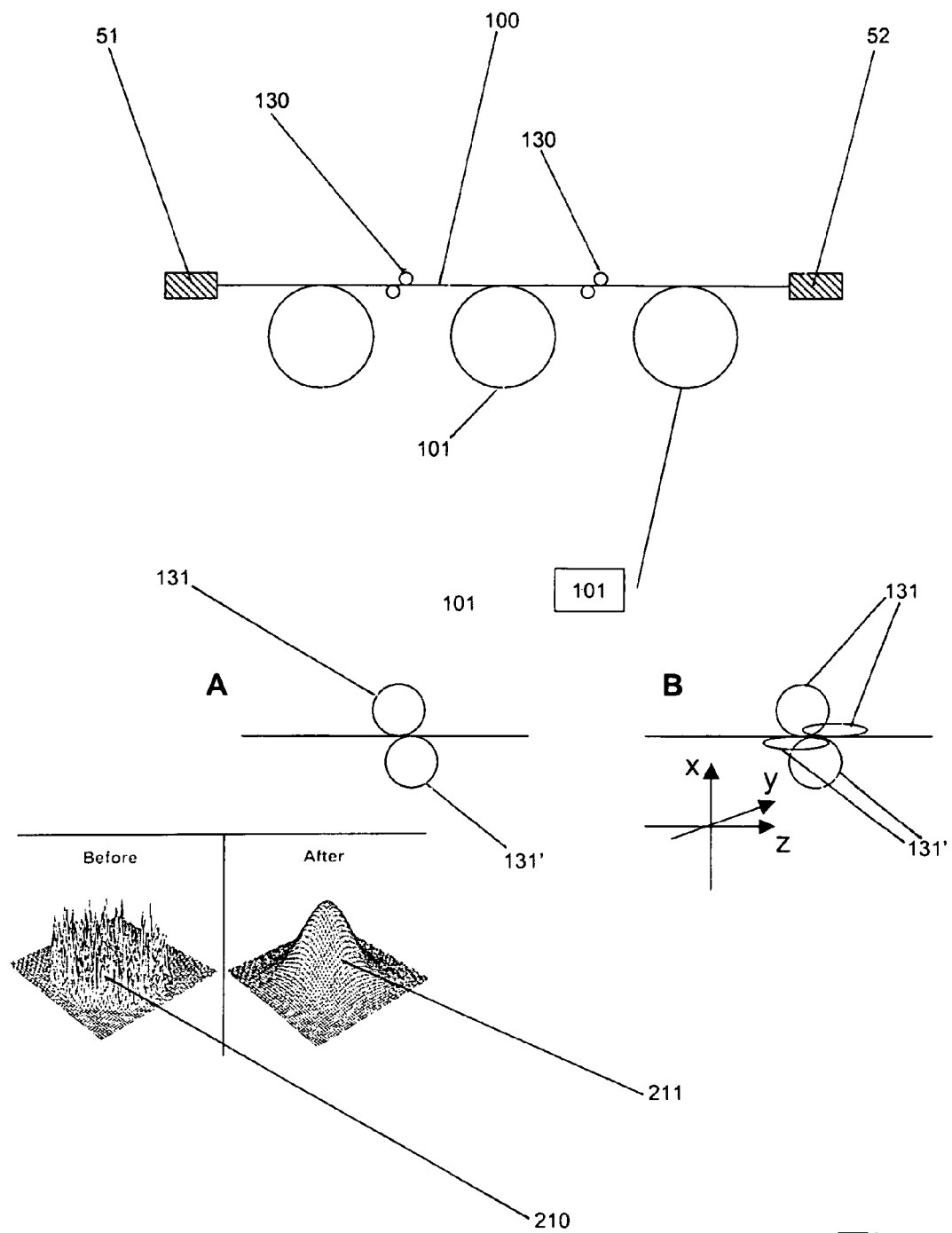
FIG. 4f is a schematic view of a pumped fiber laser.

In FIG. 4f, distributed mode discriminator sections (130) consist of the fiber (100) itself without sectioning or splicing of the fiber. The mode discrimination is achieved by using tightly bent fiber sections (130) (with bending radii on the order of a few to a few tens of centimeters) The bent fiber sections (130) can be bent in a circular or in a kidney shape. When a multimode laser beam (210) passes through such a tightly bent section (130) of the fiber (100) having a multimode fiber core with a diameter, d>>λ (e.g., a diameter of 30 µm or greater), only a monomode laser beam (211) emerges from the tightly bent section of the fiber. The tightly bent fiber sections (131) can be combined in three-dimensional arrangements, as shown in FIG. 4f, to homogenously discriminate modes that are traveling in the fiber (100). For example, bending a fiber (100) in a clockwise direction (131) can suppress a mode that travels at the outer fiber radius, while not suppressing a mode at the inner fiber radius. By adding a counterclockwise bent fiber (131') section, the mode that traveled at the inner radius in the clockwise bent fiber section (131) now travels at the outer radius of the counterclockwise bent fiber section (131') and is discriminated. This principle can be expanded to more than two dimensions, as shown in FIG. 4f.

Figure 5A:
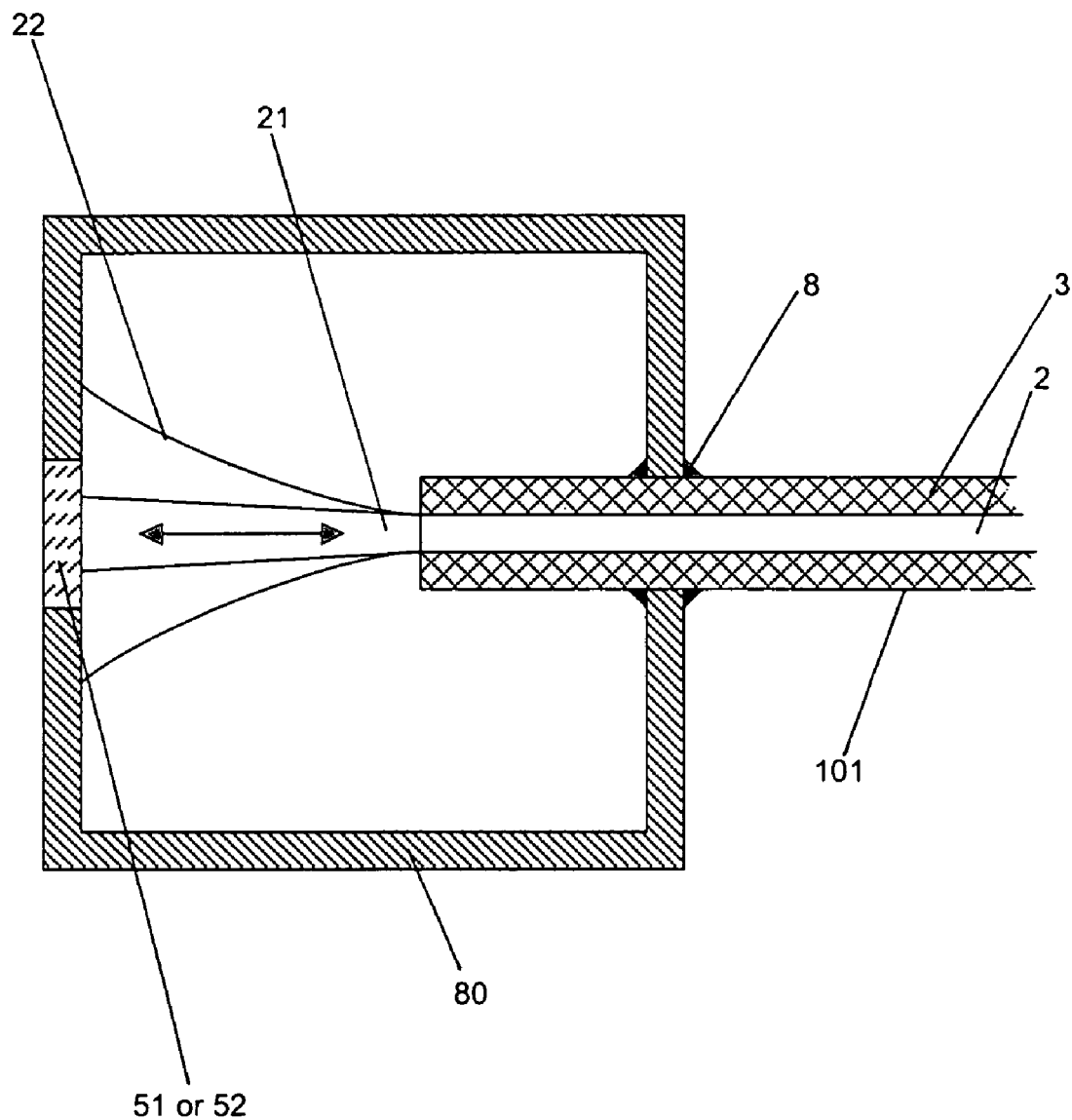
FIG. 5a is a schematic cross-sectional view of a fiber laser with an end-mounted mode discriminator section.

Referring to FIG. 5a, the laser light emerging from the end of a fiber section (101) can be retroreflected by an out-coupler (51) or rear mirror (52) of the laser resonator. The lowest order mode (21) can emerge from the fiber end and propagate through free space at a low divergence and be reflected by the out-coupler mirror (51) or rear mirror (52) and travel back through free space to the fiber end and couple efficiently back into the fiber end. Higher order modes (22) are effectively suppressed because their higher divergence prohibits efficient reentry (coupling) to the fiber end after being retroreflected by the outcoupler (51) or rear mirror (52).

Figure 5B:
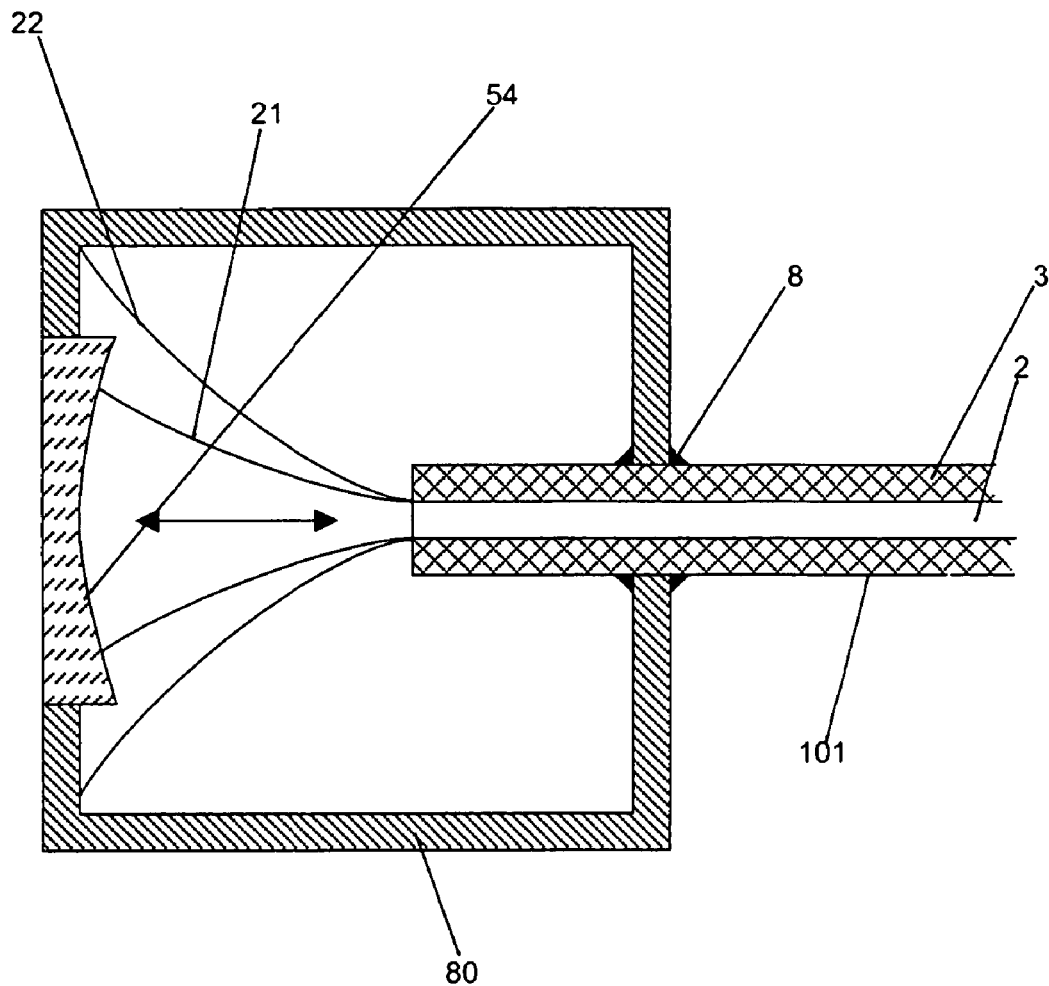
FIG. 5b is a schematic cross-sectional view of a fiber laser with an end-mounted mode discriminator section.

Referring to FIG. 5b, a curved surface curvature (54) of outcoupler (51) or rear mirror (52) can optimize the coupling of the desired mode (21) to the fiber end. Utilizing this technique, the coupling of the desired mode to the fiber end after free space propagation and mirror reflection can be further enhanced, while the coupling efficiency of any undesired mode can be further decreased.

Figure 5C:
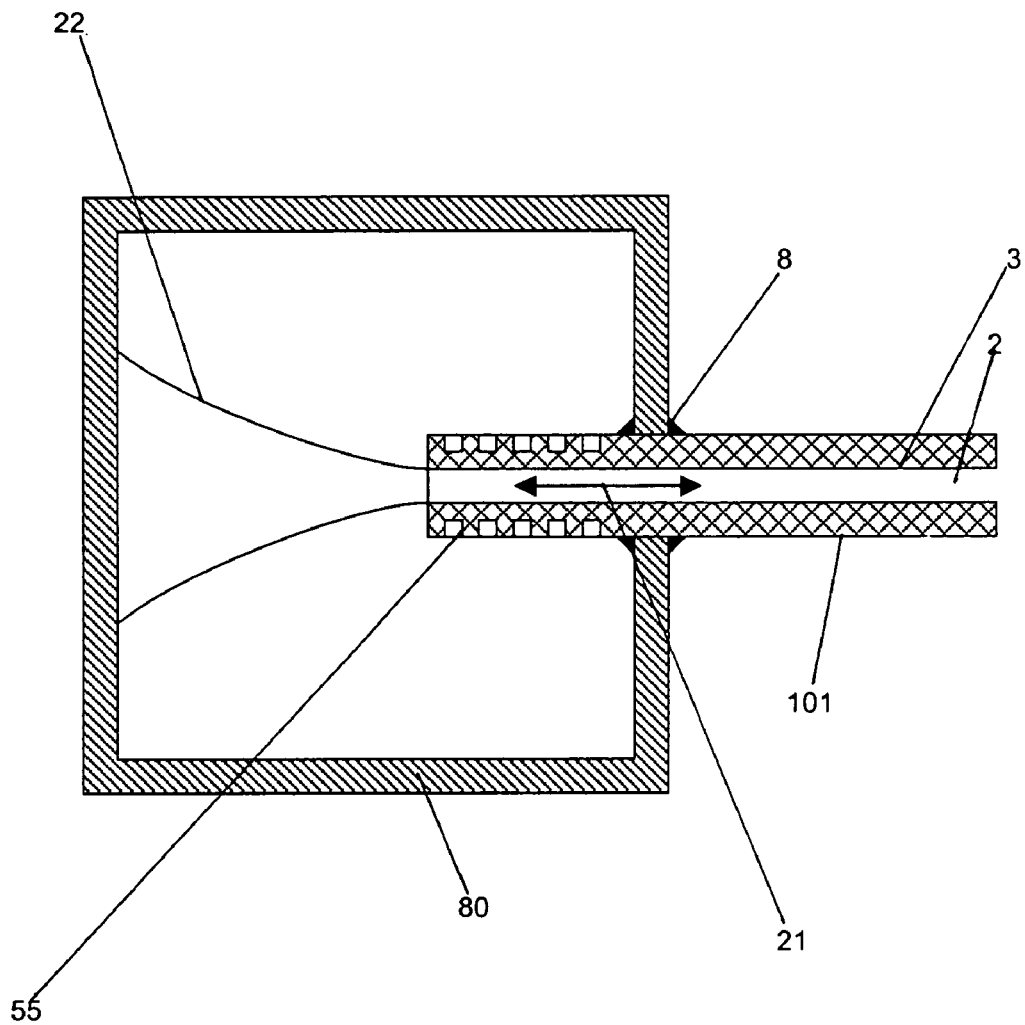
FIG. 5c is a schematic cross-sectional view of a fiber laser with an end-mounted mode discriminator section.

Referring to FIG. 5c, the lowest order mode can be reflected by an optimized fiber grating (55). This fiber grating is optimized for the reflection of the desired mode (21), which in this case does not leave the fiber end, while at least partially transmitting all higher order modes (22). The higher order modes experience increased outcoupling losses and therefore are efficiently suppressed.

OTHER EMBODIMENTS

It is to be understood that while the invention has been described in conjunction with the detailed description thereof, the foregoing description is intended to illustrate and not limit the scope of the invention, which is defined by the scope of the appended claims. Other aspects, advantages, and modifications are within the scope of the following claims.

What is claimed is:

1. An optical fiber for producing laser radiation at a characteristic wavelength, the optical fiber comprising:
   a first multimode core region having a first index of refraction, the core region being adapted for guiding the laser radiation in a longitudinal direction of the fiber and adapted for guiding pump radiation; and
   an active region embedded within the core region for producing radiation at the characteristic wavelength when pumped by pump radiation, the active region having a transverse dimension smaller than the characteristic wavelength such that less than about 10% of the radiation produced at the characteristic wavelength in the active region is confined to the active region and such that the optical fiber has a gain along its longitudinal direction that is sufficiently small so that a desired laser mode is above its lasing threshold while all other modes are below their lasing threshold.

2. The optical fiber of claim 1, wherein less than about 5% of the radiation produced at the characteristic wavelength in the active region is confined in the active region.

3. The optical fiber of claim 1, wherein less than about 2% of the radiation produced at the characteristic wavelength in the active region is confined in the active region.

4. The optical fiber of claim 1, wherein the transverse dimension of the active region is smaller than the characteristic wavelength.

5. The optical fiber of claim 1, wherein the active region has a second index of refraction different from the first index of refraction, and the combination of the transverse dimension of the active region and the difference between the first index of refraction and the second index of refraction are such that the radiation produced in the active region is not confined to the active region.

6. The optical fiber of claim 1, wherein the desired mode is the lowest order mode of the optical fiber.

7. The optical fiber of claim 1, wherein the desired mode is a Gaussian mode of the optical fiber.

8. The optical fiber of claim 1, further comprising a mode discriminator for discriminating against undesired modes of light generated in the multimode fiber while allowing a desired mode of light to propagate in the multimode fiber.

9. The optical fiber of claim 8, wherein the mode discriminator is a free space propagation path defined between a mirror and the multimode fiber.

10. The optical fiber of claim 8, wherein the mode discriminator includes a free space propagation path, the optical fiber further comprising an optical element located in the free space propagation path.

11. The optical fiber of claim 10, wherein the optical element is a lens located within the free space propagation path between a first fiber section and a second fiber section.

12. The optical fiber of claim 10, wherein the optical element is adapted to image light emerging from an end of the first fiber section to the end of the second fiber section.

13. The optical fiber of claim 10, wherein the optical element is adapted to discriminate against a lowest order mode and to couple a desired higher order mode from the first fiber section to the second fiber section.

14. The optical fiber of claim 10, wherein the optical element is a mirror.

15. The optical fiber of claim 8, further comprising:
a second multimode optical fiber for guiding the laser radiation, and
wherein the mode discriminator is a free space propagation path between the first multimode fiber and the second multimode fiber.

16. The optical fiber of claim 15, further comprising:
an optical element located in the free space propagation path, and
wherein the optical element is adapted to transmit light emitted from the first multimode fiber in a desired mode into the second multimode optical fiber.

17. The optical fiber of claim 16, wherein the optical element is a lens.

18. The optical fiber of claim 8, wherein the mode discriminator is a fiber grating.

19. The optical fiber of claim 8, further comprising:
a second multimode optical fiber for guiding the laser radiation, and
wherein the mode discriminator is a third multimode fiber located between the first multimode fiber and the second multimode fiber.

20. The optical fiber of claim 19, wherein the third multimode fiber has an index of refraction that varies in the radial direction of the fiber.

21. The optical fiber of claim 8, wherein the mode discriminator is a tightly bent section of the optical fiber.

22. The optical fiber of claim 21, wherein the tightly bent section of the optical fiber is bent substantially in the shape of a kidney.

23. The optical fiber of claim 8, wherein the mode discriminator is multiple tightly bent sections of the optical fiber, the bent sections laying substantially in non-parallel planes.

24. The optical fiber of claim 23, wherein at least one tightly bent fiber section of the optical fiber is bent substantially in the shape of a kidney.

25. The optical fiber of claim 1, further comprising a mode discriminator means for discriminating against undesired modes of light generated in the multimode fiber while allowing a desired mode of light to propagate in the multimode fiber.

26. The optical fiber of claim 25, wherein the transverse dimension of the active region is smaller than the characteristic wavelength.

27. The optical fiber of claim 25, wherein the desired mode is the lowest order mode.

28. The optical fiber of claim 25, wherein the desired mode is a Gaussian mode.

29. A method of providing laser energy with a characteristic wavelength in a single optical mode to a surface, the method comprising:
pumping an active region embedded in a multimode optical fiber with pump energy to produce the laser energy with the characteristic wavelength, wherein the active region has a transverse dimension smaller than the characteristic wavelength;
guiding the generated light to the surface with the multimode fiber through a first multimode core region having a first index of refraction; and
reducing a gain along a longitudinal direction of the optical fiber to a value that is sufficiently small so that a desired laser mode is above its lasing threshold while all other modes are below their lasing threshold by confining less than about 10% of the radiation produced at the characteristic wavelength in the active region within the active region by making the transverse dimension of the active region sufficiently small.

* * * * *